US011679505B2

(12) United States Patent
Choi et al.

(10) Patent No.: US 11,679,505 B2
(45) Date of Patent: Jun. 20, 2023

(54) GRIPPER ASSEMBLY AND METHOD FOR OPERATING THE GRIPPER ASSEMBLY

(71) Applicant: SAMSUNG ELECTRONICS CO., LTD., Suwon-si (KR)

(72) Inventors: Hyundo Choi, Yongin-si (KR); Joonkee Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 17/024,077

(22) Filed: Sep. 17, 2020

(65) Prior Publication Data

US 2021/0170597 A1 Jun. 10, 2021

(30) Foreign Application Priority Data

Dec. 10, 2019 (KR) .................. 10-2019-0164142

(51) Int. Cl.
*B25J 9/16* (2006.01)
*B25J 9/12* (2006.01)
(Continued)

(52) U.S. Cl.
CPC .............. *B25J 9/1669* (2013.01); *B25J 9/12* (2013.01); *B25J 15/0226* (2013.01); *B25J 15/103* (2013.01); *B25J 17/0241* (2013.01); *F16F 1/06* (2013.01); *F16H 1/06* (2013.01); *G01N 35/0099* (2013.01)

(58) Field of Classification Search
CPC .................. B25J 15/0004; B25J 15/0213; B25J 15/0226; B25J 15/086; B25J 15/103; B25J 9/1669; G01N 35/0099; G01N 2035/0405; B67B 7/182
See application file for complete search history.

(56) References Cited

U.S. PATENT DOCUMENTS 4,598,942 A * 7/1986 Shum .................. B25J 15/103
901/31
5,161,846 A * 11/1992 Yakou .................. B25J 9/1612
901/32
(Continued)

FOREIGN PATENT DOCUMENTS

CN 207030408 U 2/2018
EP 0497112 A1 8/1992
(Continued)

OTHER PUBLICATIONS

"MultiPurpose Sampler MPS for GC and GC/MS", Gerstel MPS Autosampler / Sample Preparation Robot for GC & GC/MS, Sep. 11, 2020, 2 pages total, www.gerstel.com/en/mps-gc-ms-autosampler.htm.
(Continued)

*Primary Examiner* — Dean J Kramer
(74) *Attorney, Agent, or Firm* — Sughrue Mion, PLLC

(57) ABSTRACT

A gripper assembly includes a base having a hollow area extending in a first direction, at least three grippers arranged along a circumference of the base, the at least three grippers configured to be rotatable about respective rotational axes extending in the first direction, and a first power transmitter configured to rotate the at least three grippers at the same time in a first rotational direction about the respective rotational axes.

18 Claims, 20 Drawing Sheets

(51) Int. Cl.
  *B25J 15/10* (2006.01)
  *B25J 15/02* (2006.01)
  *B25J 17/02* (2006.01)
  *F16F 1/06* (2006.01)
  *F16H 1/06* (2006.01)
  *G01N 35/00* (2006.01)

(56) References Cited

U.S. PATENT DOCUMENTS

| | | |
|---|---|---|
| 6,435,582 B1 * | 8/2002 | DaSilva ............... G01N 35/04 294/94 |
| 9,085,413 B2 | 7/2015 | Rosmarin et al. |
| 9,156,171 B2 * | 10/2015 | Hecht ................. B25J 15/0028 |
| 9,670,044 B2 | 6/2017 | Weber |
| 2006/0115385 A1 | 6/2006 | Jon Meyer et al. |
| 2009/0067973 A1 | 3/2009 | Eliuk et al. |
| 2010/0015007 A1 | 1/2010 | Pedrazzini |
| 2010/0165096 A1 | 7/2010 | Tassakos et al. |
| 2014/0036276 A1 * | 2/2014 | Gross ...................... G01B 7/12 356/402 |
| 2019/0039869 A1 | 2/2019 | Strzempek et al. |

FOREIGN PATENT DOCUMENTS

| | | |
|---|---|---|
| JP | 4292488 B2 | 7/2009 |
| JP | 5792814 B2 | 10/2015 |
| WO | 2019052913 A1 | 3/2019 |

OTHER PUBLICATIONS

Communication dated May 21, 2021 issued by the European Patent Office in application No. 20210170.5.

* cited by examiner

GRIPPER ASSEMBLY AND METHOD FOR OPERATING THE GRIPPER ASSEMBLY

CROSS-REFERENCE TO RELATED APPLICATION

This application claims priority to Korean Patent Application No. 10-2019-0164142, filed on Dec. 10, 2019, in the Korean Intellectual Property Office, the disclosure of which is incorporated herein in its entirety by reference.

BACKGROUND

1. Field

Example embodiments of the disclosure relate to a gripper assembly and a method of operating the gripper assembly.

2. Description of Related Art

In recent years, research in the field of semiconductor processing equipment, low-temperature operation devices, and medicine and biology has increased the need to transport samples and components in a closed space such as a vacuum chamber or a low-temperature container. To this end, the development of picking robots for holding a sample or part is actively progressing. A picking robot needs a gripper device capable of quickly and accurately picking up atypical objects, that is, objects having various shapes, sizes, and materials.

When a sample in fluid form is transported in a sample case, a lid of the sample case may be locked after the sample is contained in the sample case. In order to take the sample out of the sample case and use it, a gripper device for gripping the sample case and a gripper device for opening the lid of the sample case may be separately required. When using a different gripper device depending on the purpose, a lot of space may be taken up by the gripper devices, which may lead to problems in terms of cost and increased process yields.

SUMMARY

Provided are a gripper assembly capable of gripping a sample case using a single gripper assembly and opening a lid of the sample case and a method of operating the gripper assembly.

Provided are a gripper assembly capable of controlling a holding force for holding a sample case and a method of operating the gripper assembly.

Provided are a gripper assembly including a sample carrier and a method of operating the gripper assembly.

Additional aspects will be set forth in part in the description which follows and, in part, will be apparent from the description, or may be learned by practice of the presented embodiments of the disclosure.

According to an aspect of an example embodiment, there is provided a gripper assembly including: a base having a hollow area extending in a first direction; at least three grippers arranged along a circumference of the base, the at least three grippers configured to be rotatable about respective rotational axes extending in the first direction; and a first power transmitter configured to rotate the at least three grippers at the same time in a first rotational direction about the respective rotational axes.

The gripper assembly may further include: a first drive motor configured to generate a first driving force transmitted to the at least three grippers; and a first elastic body, wherein one end of the first elastic body is connected to the first power transmitter and another end of the first elastic body is connected to the first drive motor, the first elastic body configured to transmit the first driving force to the first power transmitter.

The gripper assembly may further include: a second drive motor configured to generate a second driving force for rotating the base about the first direction; and a second power transmitter configured to transmit the second driving force to the base such that the base rotates about the first direction.

The gripper assembly may further include: a controller comprising at least one processor, the controller being configured to control the first drive motor and the second drive motor, wherein the controller is further configured to, in a case where the second drive motor is operated, controls the first drive motor such that a rotational speed of the base and a rotational speed of the first power transmitter are the same.

The first power transmitter may include at least three power transmission cams corresponding to the at least three grippers, respectively.

The gripper assembly may further include: a stopper configured to limit the first elastic body from expanding above a certain length.

The gripper assembly may further include: a second elastic body, wherein one end of the second elastic body is connected to the base and another end of the second elastic body is connected to a gripper from among the at least three grippers, the second elastic body being configured to apply a restoring force to the gripper in a second rotational direction opposite to the first rotational direction.

The gripper assembly may further include: a controller including at least one processor, the controller being configured to control the first drive motor, wherein the controller is further configured to control the first drive motor to expand the first elastic body to a first length, the first length being a length of the first elastic body in which the at least three grippers start gripping a lid of a sample case, or the sample case, below the base.

The controller may be further configured to control the first drive motor to expand the first elastic body beyond the first length.

The gripper assembly may further include: a contact pad at one end of a gripper from among the at least three grippers.

The gripper assembly may further include: a sample carrier in the hollow area of the base.

The gripper assembly may further include: a drive motor configured to generate a driving force for moving the sample carrier in the first direction; and a second power transmitter configured to transmit the driving force to the sample carrier such that the sample carrier moves in the first direction.

The gripper assembly may further include: a support guide on an inner wall of the hollow area, the support guide being configured to support the sample carrier.

According to an aspect of an example embodiment, there is provided a method for operating a gripper assembly that includes a base having a hollowing area extending in a first direction, at least three grippers arranged along a circumference of the base and configured to be rotatable about respective rotational axes extending in the first direction, and a first power transmitter configured to rotate the at least three grippers at the same time in a first rotational direction about the respective rotational axes. The method includes: fixing a sample case to a case supporter; generating a first driving force via a first drive motor of the gripper assembly; transmitting the first driving force to the first power transmitter via a first elastic body of the gripper assembly, one end of the first elastic body being connected to the first power transmitter and another end of the first elastic body being connected to the first drive motor; rotating the at least three grippers in the first rotational direction about the respective rotational axes by the first power transmitter receiving the first driving force; and expanding the first elastic body to a preset first length or less based on the transmitting the first driving force to the first power transmitter via the first elastic body.

The expanding may include expanding the first elastic body to the preset first length, the preset first length being a length of the first elastic body in which the at least three grippers start gripping a lid of the sample case below the base.

The method may further include expanding the first elastic body beyond the preset first length such that a contact force between the at least three grippers and the lid of the sample case is increased.

The gripper assembly may include a stopper configured to limit the first elastic body from expanding above a certain length.

The method may further include: generating a second driving force via a second drive motor of the gripper assembly; transmitting the second driving force to the base via a second power transmitter of the gripper assembly such that the base rotates and the base causes the at least three grippers to rotate about the base; operating, while transmitting the second driving force to the base, the first drive motor such that a rotational speed of the first power transmitter is the same as a rotational speed of the base; and opening the lid of the sample case, held by the at least three grippers, by the at least three grippers rotating about the base while the first drive motor is operated.

The method may further include: generating a second driving force via a second drive motor of the gripper assembly; and raising or lowering a sample carrier of the gripper assembly by a second power transmitter of the gripper assembly transmitting the second driving force to the sample carrier.

According to an aspect of an example embodiment, a gripper assembly may be provided. The gripper assembly may include: at least three grippers arranged around a first rotational axis extending in a first direction, the at least three grippers being configured to be rotatable about respective second rotational axes extending in the first direction; a first drive motor configured to generate a first driving force; a first power transmitter configured to receive the first driving force, and rotate the at least three grippers at a same time in a first rotational direction about the respective second rotational axes, based on receiving the first driving force, such that contact ends of the at least three grippers approach the first rotational axis; a second drive motor configured to generate a second driving force; and a second power transmitter configured to receive the second driving force and cause the at least three grippers to rotate about the first rotational axis based on the second driving force.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
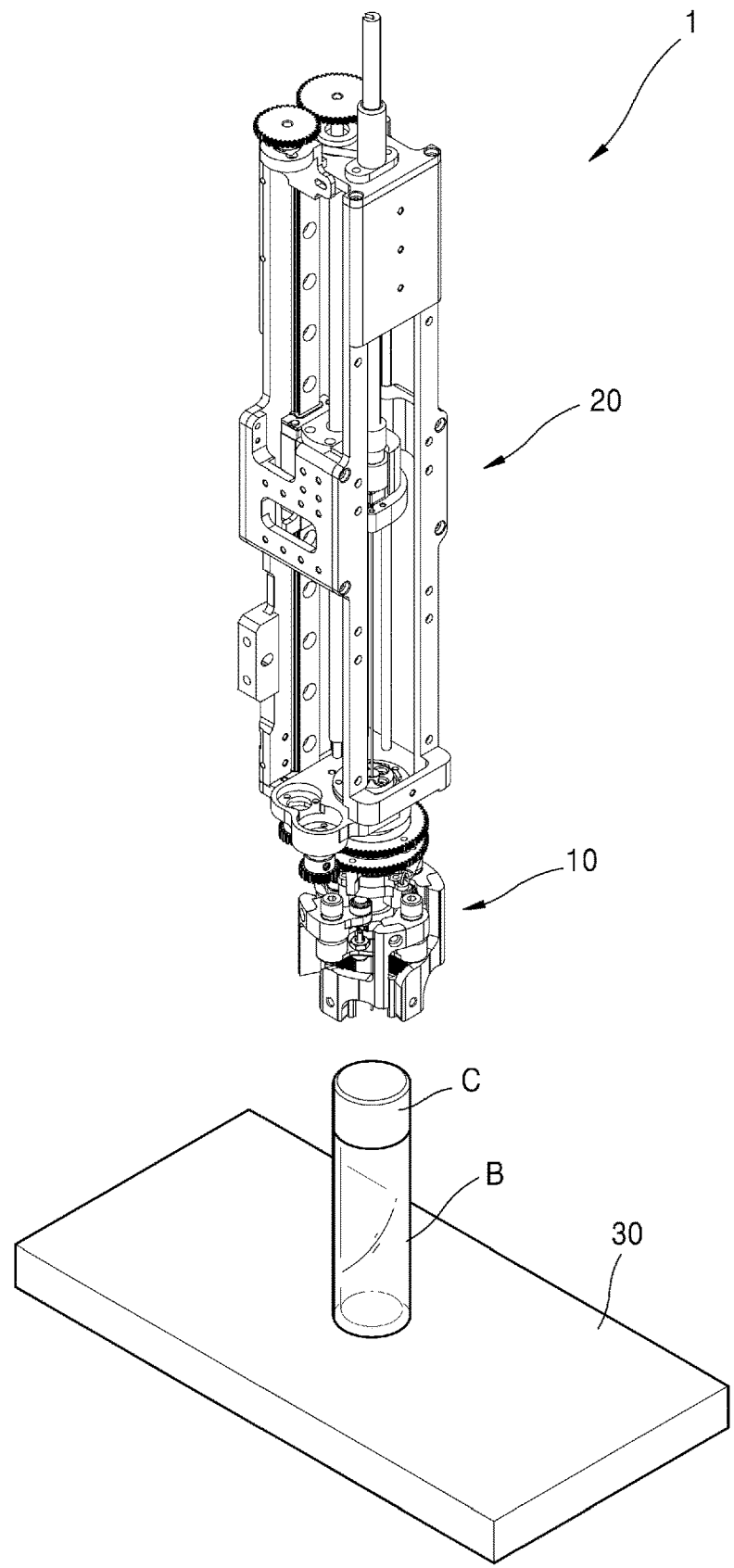
FIG. 1 is a perspective view of a gripper assembly according to an example embodiment.

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

For example, when an element is referred to as being "on" or "above" another element, it may be directly on the other element, or intervening elements may also be present.

It will be understood that, although the terms first, second, etc. may be used herein to describe various elements, these elements should not be limited by these terms. These terms are used only to differentiate an element from another element.

As used herein, the singular forms "a", "an", and "the" are intended to include the plural forms as well, unless the context clearly indicates otherwise. In addition, it will be understood that when a unit is referred to as "comprising" another element, it does not preclude the possibility that one or more other elements may exist or may be added.

Figure 2A:
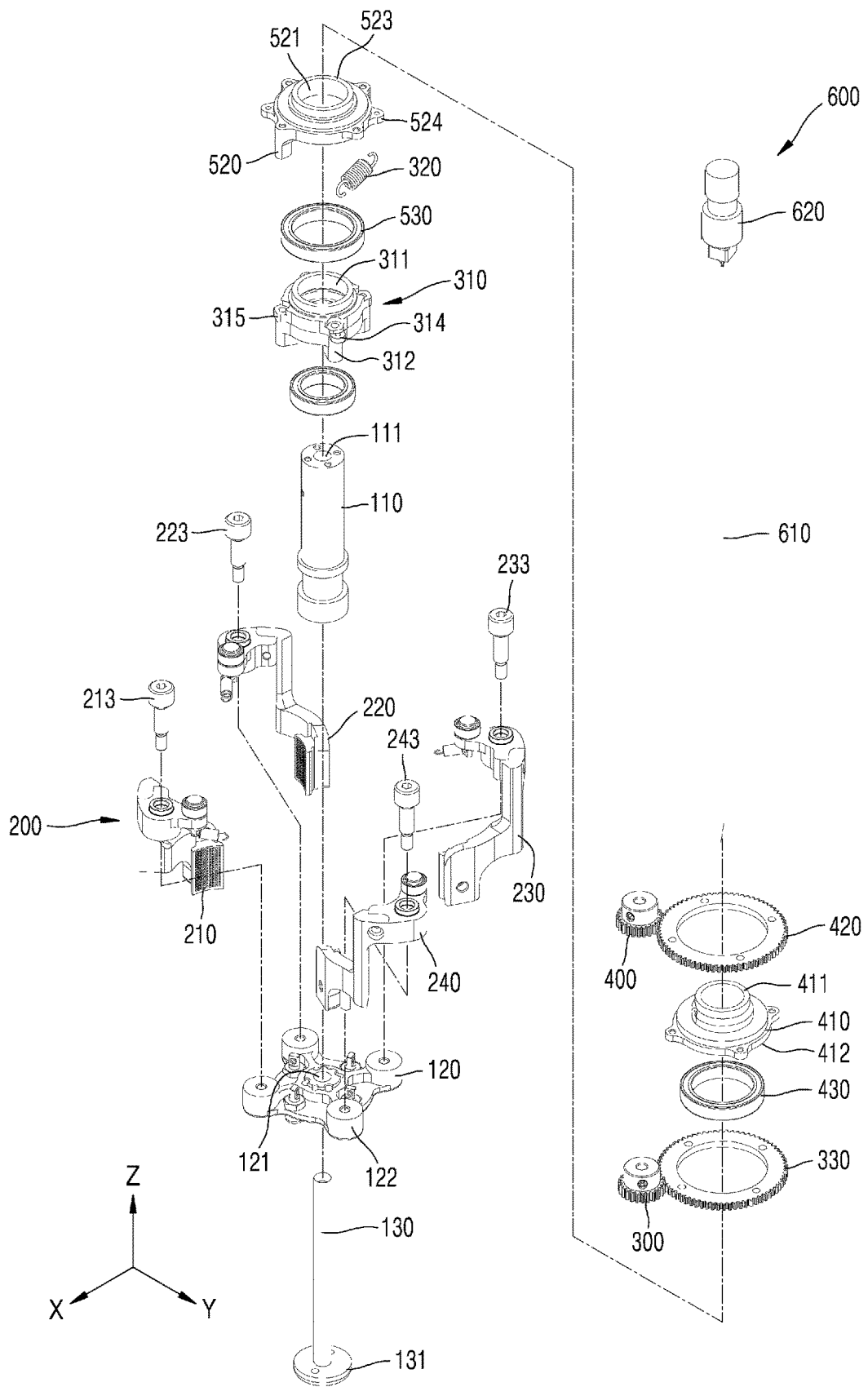
FIG. 2A is an exploded perspective view of a gripper device of the gripper assembly shown in FIG. 1.
Figure 2B:
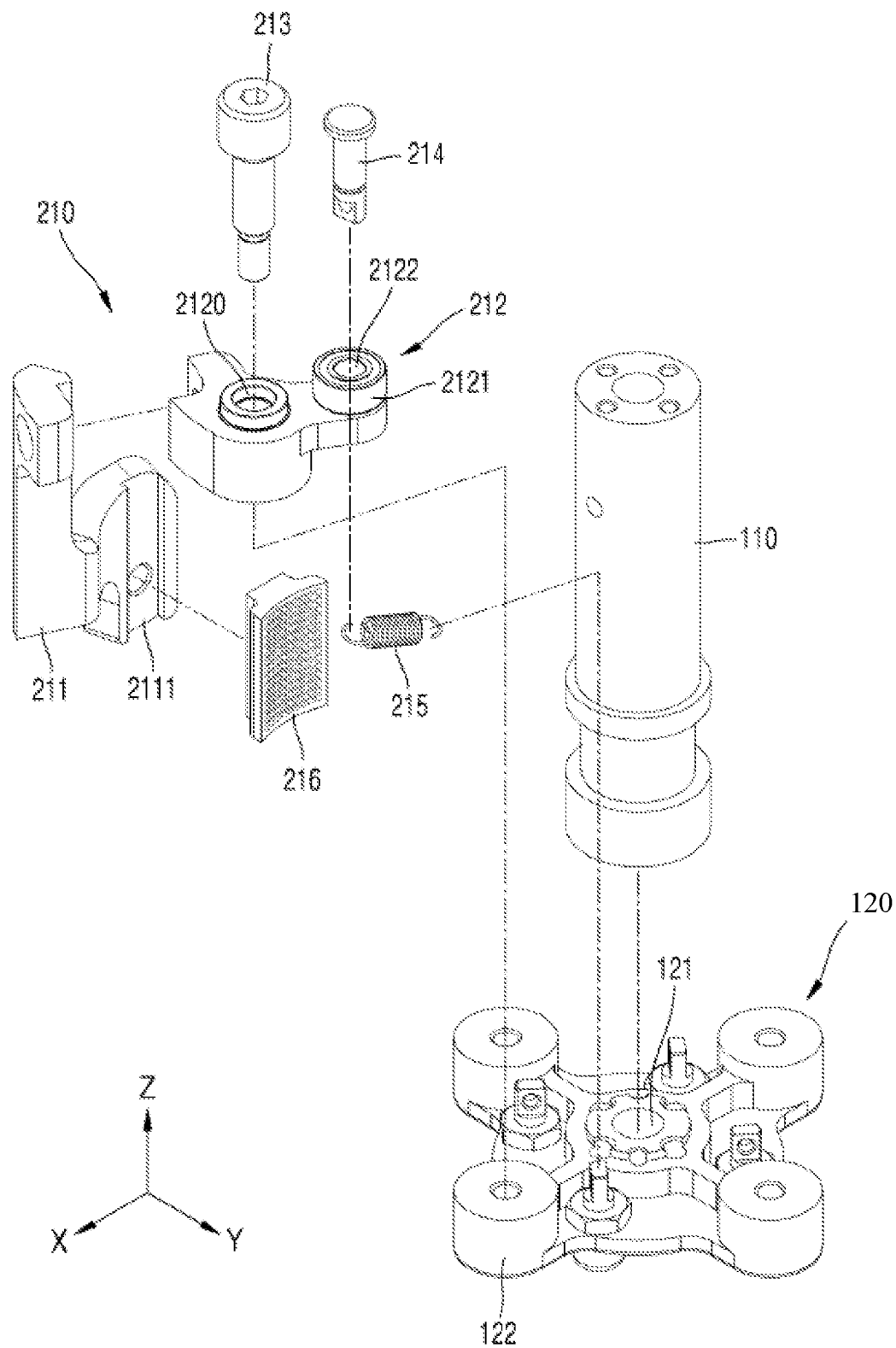
FIG. 2B is an exploded perspective view of a first gripper, a base portion, a gripper supporter, and a second elastic member, according to an example embodiment.
Figure 3:
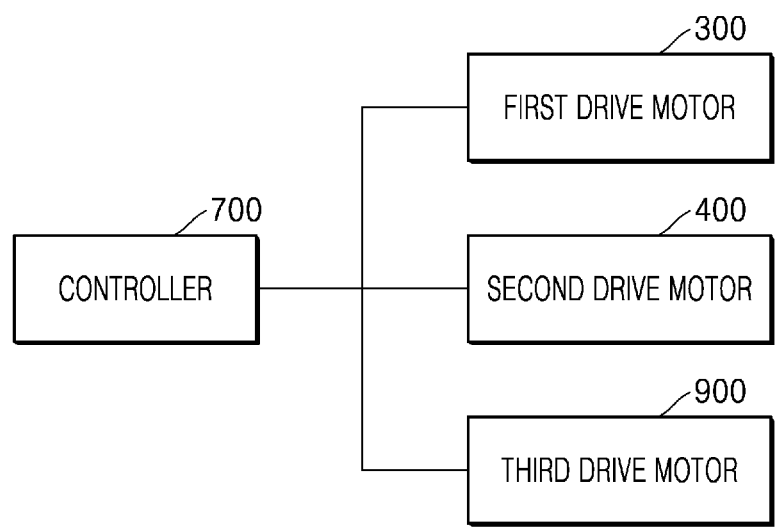
FIG. 3 is a block diagram showing a relationship between a controller and first to third drive motors, according to an example embodiment.
Figure 4:
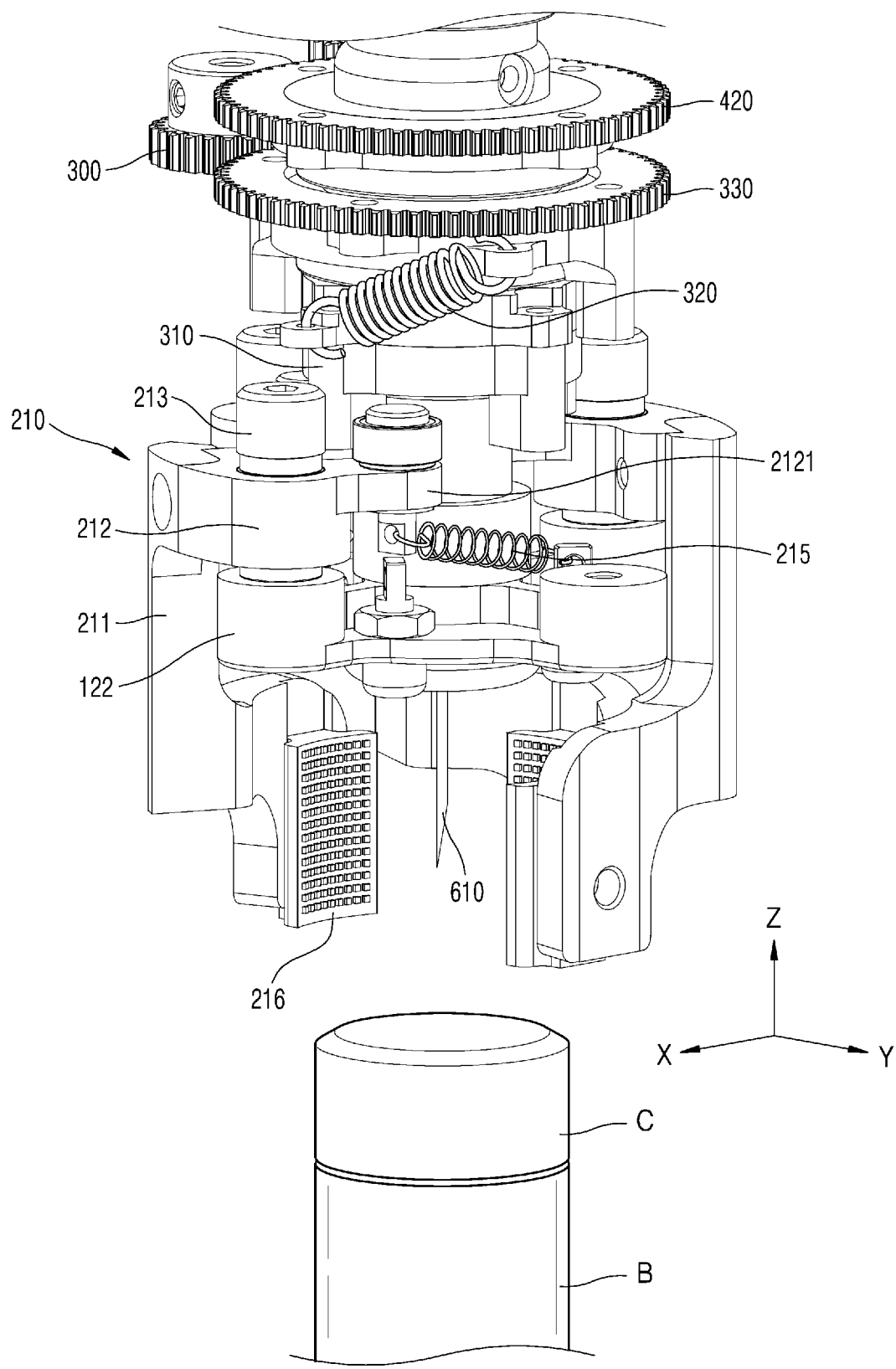
FIG. 4 is a perspective view of a gripper device according to an example embodiment.
Figure 5:
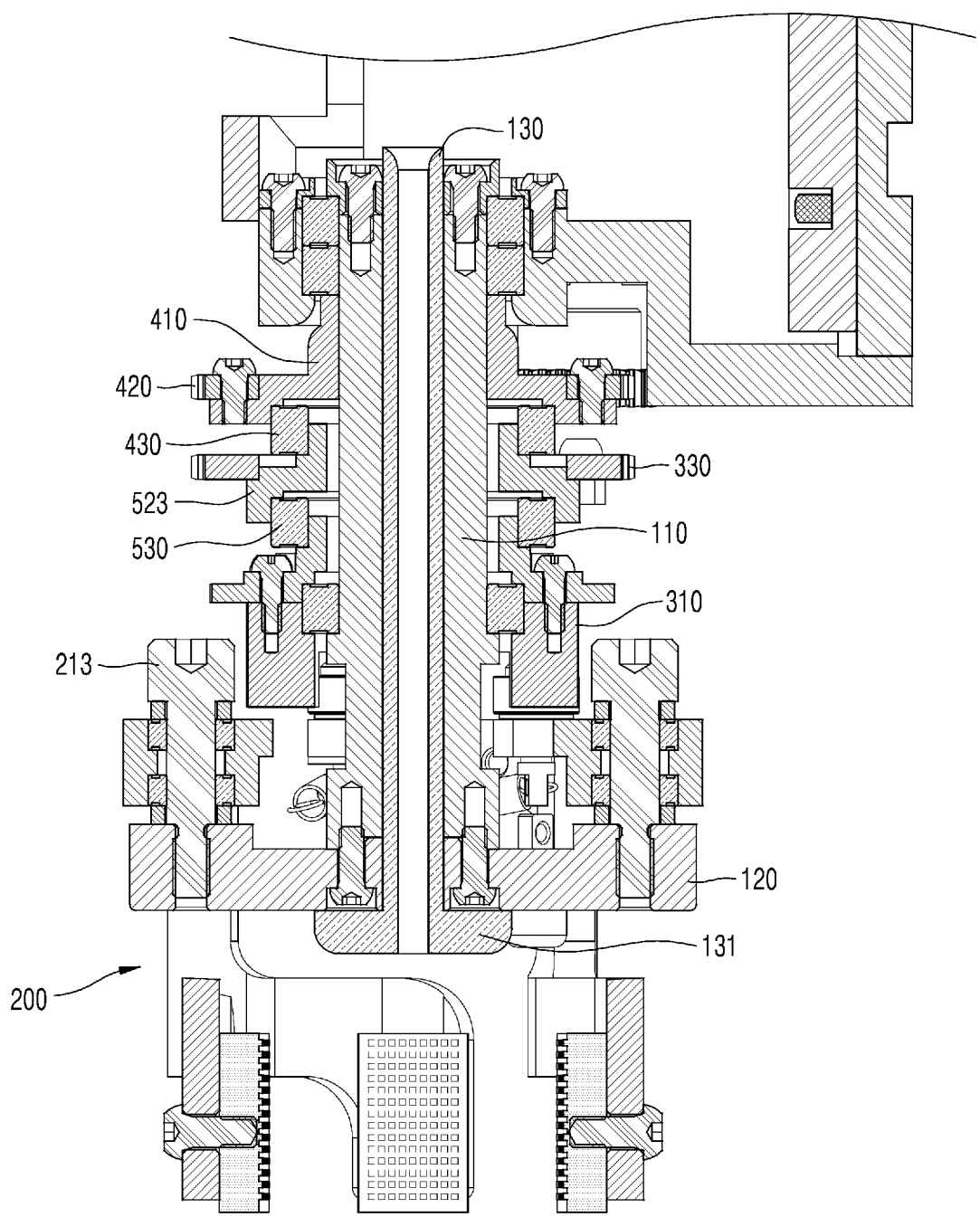
FIG. 5 is a cross-sectional view of a gripper device according to an example embodiment.

FIG. 1 is a perspective view of a gripper assembly according to an example embodiment. FIG. 2A is an exploded perspective view of a gripper device of the gripper assembly shown in FIG. 1. FIG. 2B is an exploded perspective view of a first gripper, a base portion, a gripper supporter, and a second elastic member according to an example embodiment. FIG. 3 is a block diagram showing a relationship between a controller and first to third drive motors according to an example embodiment; FIG. 4 is a perspective view of a gripper device according to an example embodiment. FIG. 5 is a cross-sectional view of a gripper device according to an example embodiment.

Referring to FIG. 1, a gripper assembly 1 according to an example embodiment may include a gripper device 10 for holding a sample case B accommodating a sample or a lid C of the sample case, a sample transfer device 20 for moving a sample carrier 600 (see FIG. 2), and a case supporter 30 for fixing the sample case B. An object that the gripper device 10 may grip in this specification may be not only the sample case B or the lid C of the sample case, but also another object that may be held and transferred, for example, the sample itself. For example, the sample may be a compound or a composite. However, the disclosure is not limited thereto. In addition, the sample accommodated in the sample case B and the lid C of the sample case B may be in fluid form as well as in solid form. Hereinafter, for convenience of description, an example embodiment in which a fluid sample is accommodated in the sample case B and sealed by the lid C of the sample case B will be described.

Referring to FIG. 2A, FIG. 3, and FIG. 5, the gripper device 10 according to an example embodiment may include a base portion 110, a gripper supporter 120, a support guide 130, three or more grippers 200, a first drive motor 300, a first power transmitter 310, a first elastic member 320, a second drive motor 400, a second power transmitter 410, a sample carrier 600, and a controller 700.

The base portion 110 is a support member capable of supporting the sample carrier 600 which will be described later below. For example, the base portion 110 may include a hollow area 111 extending in a first direction Z. The sample carrier 600 may be disposed in the above-described hollow area 111, and thus the sample carrier 600 may transfer a sample from the sample case B below the base portion 110.

The gripper supporter 120 may be disposed at a lower end of the base portion 110 to support the three or more grippers 200. For example, the gripper supporter 120 may include a central hole 121 into which the base portion 110 may be inserted, and a rotation axis supporter 122 arranged along a circumference of the central hole 121. For example, the gripper supporter 120 may be arranged to be fixed to the base portion 110 inserted into the central hole 121. In addition, the rotation axis supporter 122 included in the gripper supporter 120 may be arranged along the circumference of the central hole 121 so as to correspond to the number of grippers 200.

The support guide 130 is a guide member on an inner wall of the hollow area 111 provided in the base portion 110 to support the sample carrier 600. For example, the support guide 130 may be provided in a tubular shape including a hollow area extending in the first direction Z. According to an example embodiment, the support guide 130 may be inserted into the hollow area 111 of the base portion 110 to guide a moving path of the sample carrier 600. In addition, the support guide 130 may prevent a buckling phenomenon of the sample carrier 600 by supporting the sample carrier 600 in a length direction of the sample carrier 600. In addition, a lower end of the support guide 130 may be provided with a protector 131 surrounding the lower end of the base portion 110 to prevent contamination of the base portion 110 by a sample.

The three or more grippers 200 are holding members which may hold the sample case B or the lid C of the sample case B. For example, the three or more grippers 200 may include a first gripper 210, second gripper 220, third gripper 230, and a fourth gripper 240 arranged along a circumference of the base portion 110. According to an example embodiment, the first gripper 210 to the fourth gripper 240 may be supported by the rotation axis supporter 122 included in the gripper supporter 120 to be rotatable with respect to the base portion 110. Since the first gripper 210 to the fourth gripper 240 include substantially the same configuration, the first gripper 210 to the fourth gripper 240 will be described with reference to the first gripper 210 for convenience of description.

Referring to FIG. 2B and FIG. 4, the first gripper 210 may include a body portion 211, a connection portion 212, a second elastic member supporter 214, a second elastic member 215, and a contact pad 216. According to an example embodiment, the first gripper 210 may be arranged to be rotatable with respect to the base portion 110 about a rotation shaft 213 extending in the first direction Z. In this case, the rotation shaft 213 may be supported by the rotation axis supporter 122.

The body portion 211 is a support member extending in the first direction Z, wherein a contact portion 2111 capable of directly contacting the sample case B or the lid C of the sample case may be arranged at one end, and the other end may be connected to the connection portion 212 which will be described later below.

The connection portion 212, which is a connecting member capable of connecting the body portion 211 and the rotation shaft 213, may include a rotation axis supporter 2120 in which the rotation shaft 213 may be arranged, a pressing portion 2121 capable of receiving a pressing force from the first power transmitter 310, and a support hole 2122 capable of supporting the second elastic member supporter 214. For example, the rotation shaft 213 may be arranged to extend in the first direction Z to be inserted into the rotation axis supporter 2120. At this time, the pressing portion 2121 may be extended to have a certain angle with the other end of the body portion 211. Accordingly, when the pressing portion 2121 receives the pressing force in a second rotational direction, for example, a counterclockwise direction, around a central axis of the gripper device 10 from the first power transmitter 310, the body portion 211 may rotate in the first rotational direction about the rotation shaft 213. In the present example embodiment, the body portion 211 and the connection portion 212 are arranged in a separate form, but may be formed integrally.

The second elastic member 215 may apply a restoring force to the body portion 211 in the second rotational direction opposite to the first rotational direction. For example, one end of the second elastic member 215 may be fixed to the gripper supporter 120, and the other end may be fixed to the second elastic member supporter 214. For example, the other end of the second elastic member 215 may be fixed to the second elastic member supporter 214 arranged to be inserted into the support hole 2122, the second elastic member 215 may be expanded when the body portion 211 rotates in the first rotational direction, and the second elastic member 215 may be contracted when the pressing portion 2121 is not pressed by the first power transmitter 310. As a result of the second elastic member 215 contracting, the body portion 211 may be rotated in the second rotational direction, for example, a counterclockwise direction, to restore the position of the body portion 211 to its original state.

The contact pad 216 may be on the contact portion 2111 provided with the body portion 211 to improve a contact force with the sample case B or the lid C of the sample case B. For example, the contact pad 216 may include a protrusion shape, or may include a rubber material to improve friction with the sample case B or the lid C of the sample case B.

Referring again to FIGS. 2A, 4, and 5, the first power transmitter 310 is a power transmission member that transmits a driving force generated by the first drive motor 300 to the three or more grippers 200 to rotate the three or more grippers 200 at the same time. Here, the first drive motor 300 may be an electric motor, but the disclosure is not limited thereto. For example, when a driving force capable of rotating the first power transmitter 310 may be generated, the first drive motor 300 may be replaced with a magnet using a magnetic force. In addition, when the driving force is manually transmitted to the first power transmitter 310, the first drive motor 300 may not be arranged.

For example, the first power transmitter 310 may include an insertion hole 311, a power transmission cam 312 arranged along a circumference of the insertion hole 311, a first elastic member support 314, and a stopper supporter 315. The insertion hole 311 may be provided to allow the base portion 110 to be inserted, and thus the first power transmitter 310 may be rotatably supported with respect to the base portion 110. The power transmission cam 312 may apply a pressing force in the second rotational direction to a pressing portion provided in the three or more grippers 200. For example, the power transmission cam 312 may be formed to extend in the first direction Z, and may be formed in four to correspond to the numbers of first gripper 210 to fourth gripper 240. In this case, the power transmission cam 312 corresponding to the first gripper 210 may apply a pressing force to the pressing portion 2121 in the second rotational direction. The first elastic member support 314 may be at the circumference of the insertion hole 311. In addition, the stopper supporter 315 may be arranged to protrude from the insertion hole 311 at the top of the power transmission cam 312.

The first elastic member 320 may transmit the driving force generated by the first drive motor 300 to the first power transmitter 310. For example, the first elastic member 320 may have one end fixed to the first elastic member support 314 and the other end fixed to a first power transmission gear 330 connected to the first drive motor 300, in more detail, a first elastic member support hook 524 of a frame portion 523 arranged to be fixed to the first power transmission gear 330. According to an example embodiment, the first elastic member 320 may extend to a first length T1 (see FIG. 6A) when the three or more grippers 200 are held in contact with the sample case B or the lid C of the sample case B. In addition, the first elastic member 320 may extend beyond the first length T1 to improve a holding force between the three or more grippers 200 and the sample case B or the lid C of the sample case C. This will be described in more detail with reference to FIGS. 6A to 7B.

A stopper 520 is a limiting member that limits the first power transmitter 310 from rotating beyond a certain range. For example, a frame portion 523 including an insertion hole 521 into which the base portion 110 may be inserted may be provided, and the stopper 520 may be arranged to protrude from the frame portion 523 along a circumference of the insertion hole 521. For example, the stopper 520 may be provided in plural, and may be arranged to be apart from each other by a certain interval along the circumference of the insertion hole 521. A first bearing part 530 may be disposed below the frame portion 523, and as shown in FIG. 5, the stopper 520 fixed to the frame portion 523 may maintain a constant position regardless of whether the first power transmitter 310 is rotated.

The second power transmitter 410 may transmit a driving force generated by the second drive motor 400 to the base portion 110. For example, a second power transmission gear 420 connected to the second drive motor 400 may be inserted into and fixed to an upper area 411 of the second power transmitter 410. In this case, an upper area of the base portion 110 may be fixed to a lower area 412 of the second power transmitter 410. Accordingly, when the second power transmission gear 420 rotates, the base portion 110 may also rotate. At this time, the gripper supporter 120 fixed to the base portion 110 may rotate about the base portion 110, and the three or more grippers 200 supported by the gripper supporter 120 may also rotate about the base portion 110. A second bearing part 430 may be below the second power transmitter 410, and with reference to FIG. 5, rotation of the first power transmission gear 330 and the second power transmitter 410 may be independently performed.

The sample carrier 600 may transfer a sample accommodated in the sample case B. For example, the sample carrier 600 may include a pipette 610, that is tubular, extending in the first direction Z and a supporter 620 at one end of the pipette 610. For example, the pipette 610 may be arranged to be inserted into the hollow area 111 provided in the base portion 110, and may discharge or suck the sample from the other end. In addition, the pipette 610 according to an example embodiment may transfer and distribute the sucked sample to another sample case B. The sample carrier 600 according to an example embodiment may move upward or downward in the first direction Z. Matters related to the sample carrier 600 and the sample transfer device 20 shown in FIG. 1 will be described in more detail with reference to FIGS. 10A to 10C.

Referring to FIG. 3, the controller 700 is a control device that may control the configuration of the gripper assembly 1 according to an example embodiment. For example, the controller 700 may generate a driving signal for controlling the first drive motor 300, the second drive motor 400, and a third drive motor 900. The controller 700 may comprise at least one processor and memory storing computer code configured to cause, when executed by the at least one processor, the at least one processor to perform the functions of the controller 700.

Referring again to FIG. 1, the case supporter 30 is a fixing member for fixing the sample case B. The case supporter 30 according to an example embodiment may fix the sample case B while the lid C of the sample case is rotated to open the lid C of the sample case. According to an example embodiment, the case supporter 30 is provided in a substrate shape, but the disclosure is not limited thereto, and may be provided in any shape capable of fixing the sample case B.

Figure 6A:
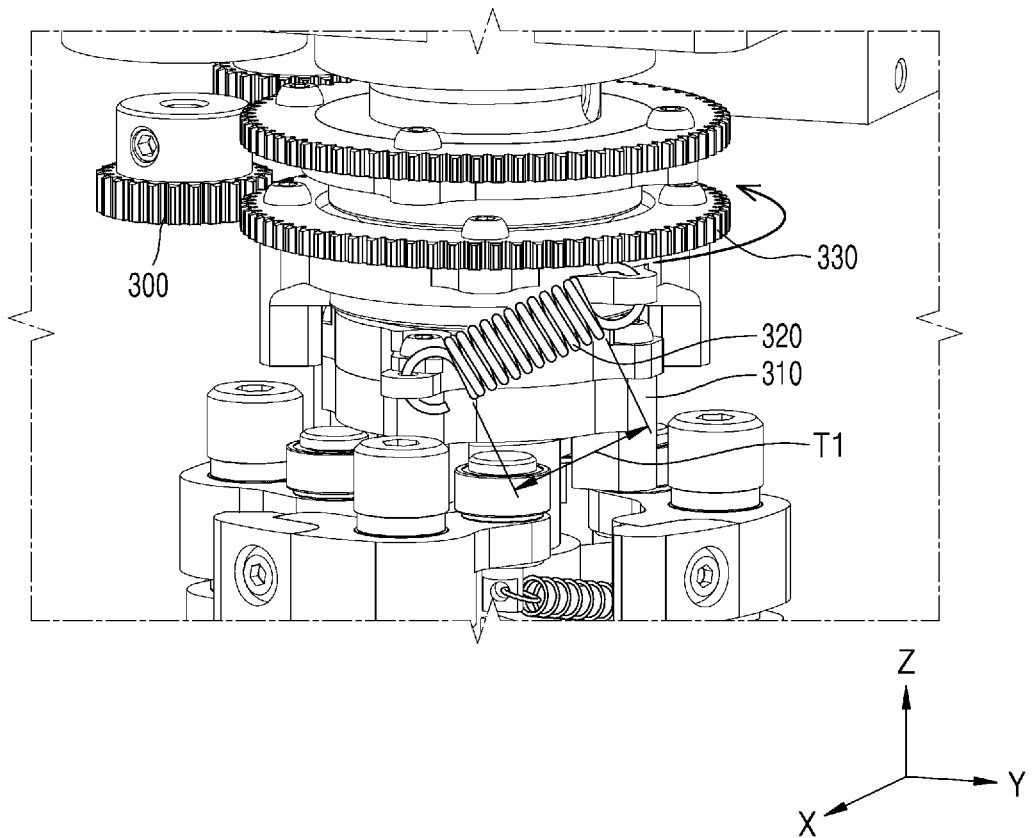
FIG. 6A is a partial perspective view of a gripper device according to an example embodiment.
Figure 6B:
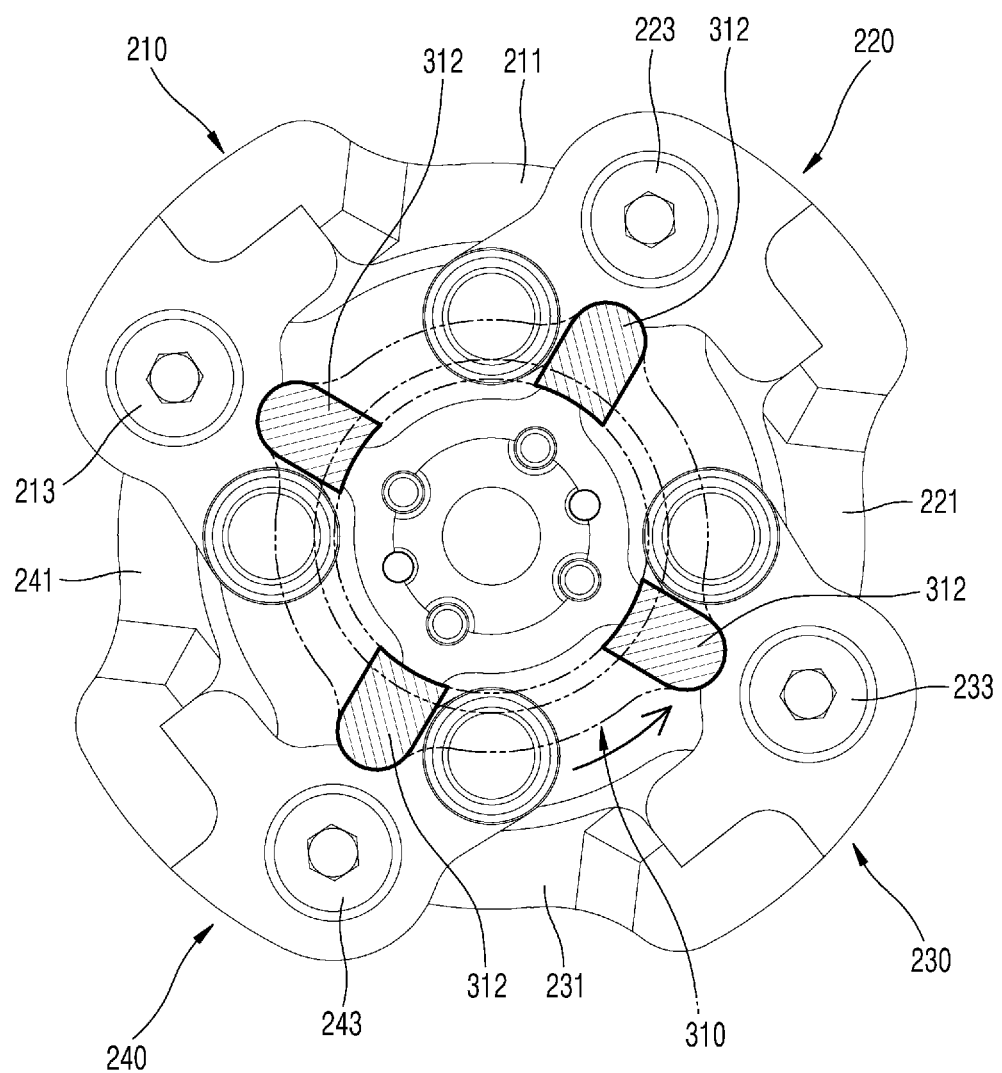
FIG. 6B is a first plan view of a first power transmitter and first to fourth grippers, according to an example embodiment.
Figure 6C:
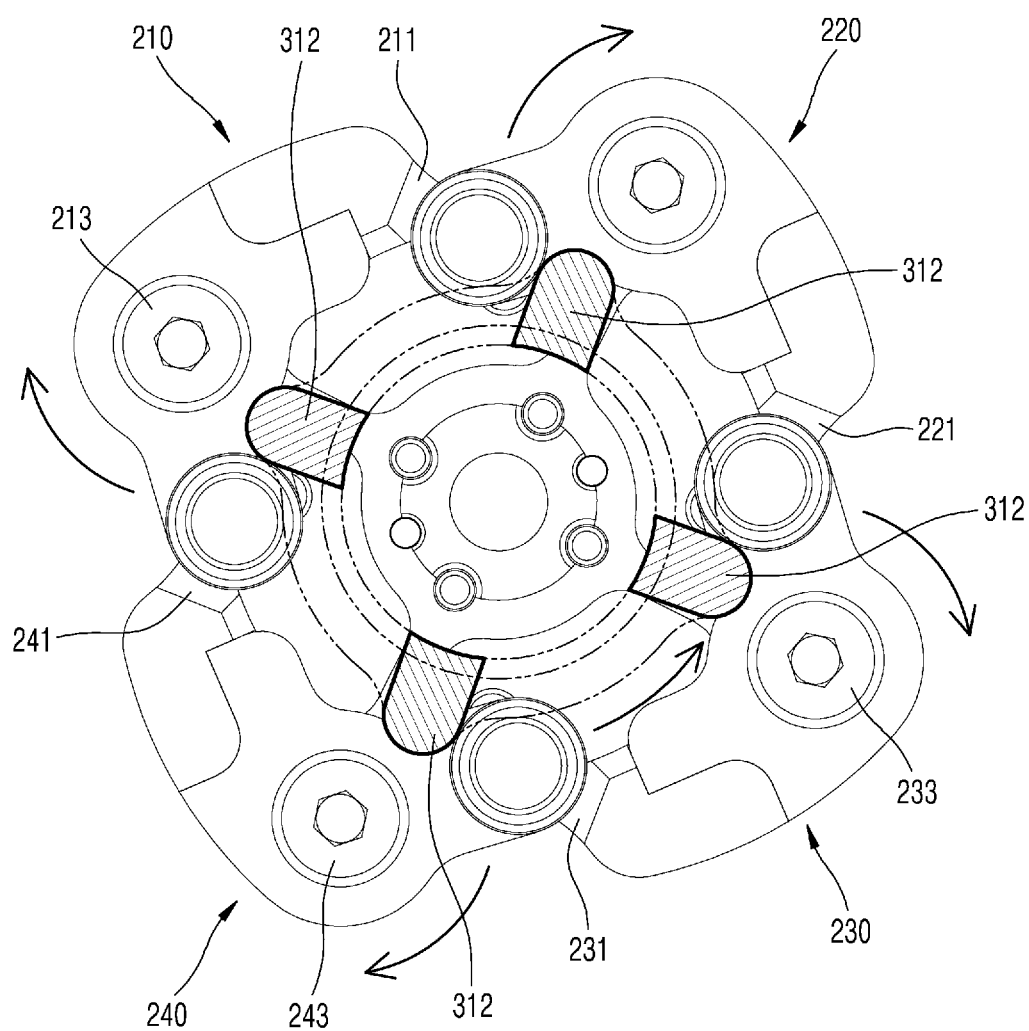
FIG. 6C is a second plan view of the first power transmitter and the first to fourth grippers, according to the example embodiment.
Figure 6D:
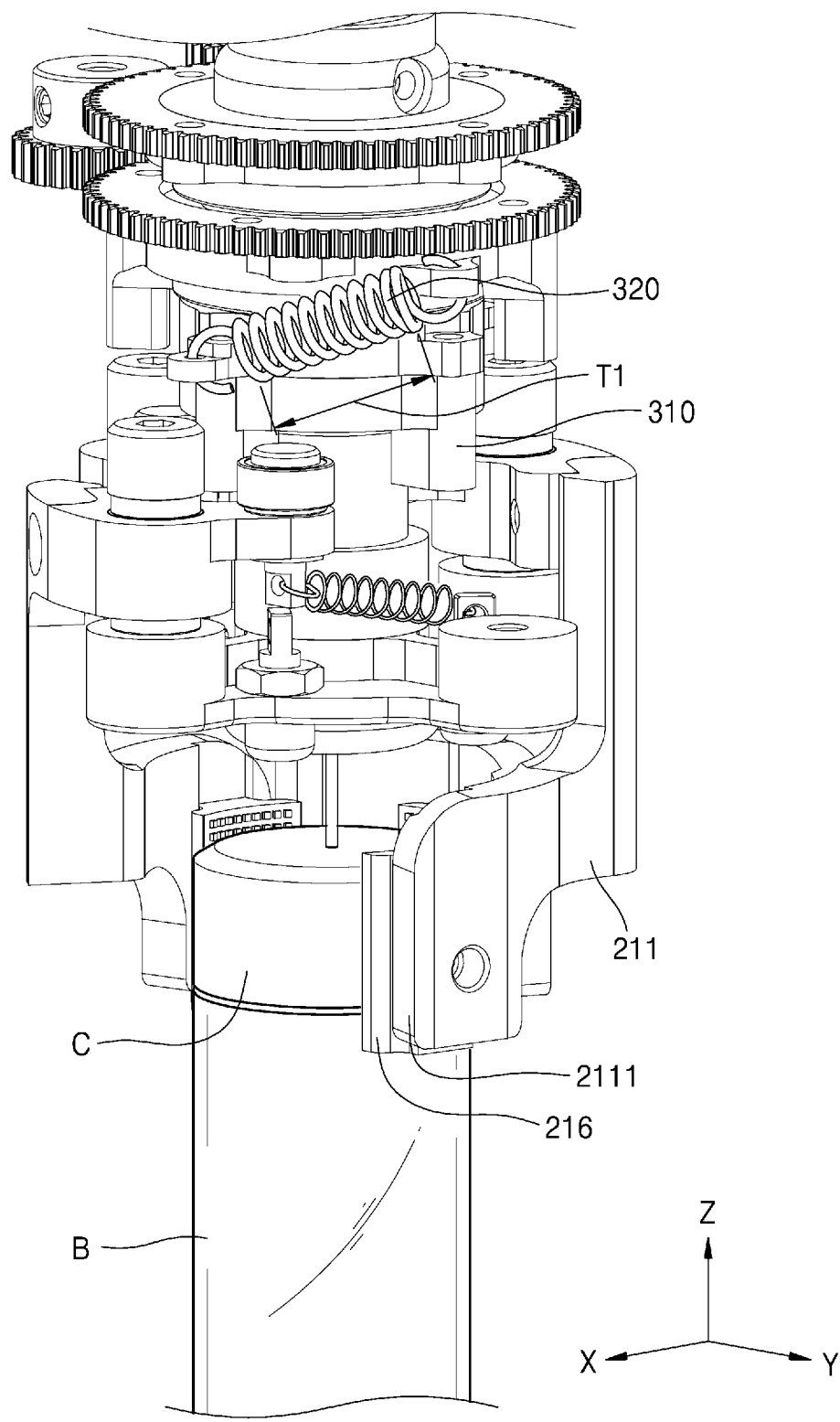
FIG. 6D is a perspective view of a gripper device according to an example embodiment gripping a lid of a sample case.

FIG. 6A is a partial perspective view of a gripper device according to an example embodiment. FIG. 6B and FIG. 6C are plan views of a first power transmitter and first to fourth grippers according to an example embodiment. FIG. 6D is a perspective view of a gripper device according to an example embodiment holding a lid of a sample case;

Referring to FIG. 6A, the first drive motor 300 according to an example embodiment may generate a driving force. The driving force generated from the first drive motor 300 may be transmitted to the first power transmission gear 330, and the first power transmission gear 330 may rotate about the base portion 110 at the center in a second rotational direction, that is, in a counterclockwise direction. As the first power transmission gear 330 rotates in the second rotational direction, the first power transmitter 310 that receives the driving force by using the first elastic member 320 may rotate in the second rotational direction about the base portion 110.

As the first power transmitter 310 rotates in the second rotational direction about the base portion 110, as shown in FIGS. 6B and 6C, the power transmission cam 312 may apply a pressing force to the pressing portion 2121 included in the first gripper 210 in the second rotational direction. Accordingly, the body portion 211 connected to the connection portion 212 may rotate in a first rotational direction, that is, in a clockwise direction, about the rotation shaft 213. Body portions 221 to 241 included in the second gripper 220 to the fourth gripper 240 may also rotate in the first rotational direction about rotation shafts 223, 233, and 234 (e.g. rotation axes), respectively, in the same manner as the first gripper 210. The matters related to the second gripper 220 to the fourth gripper 240 are omitted for convenience of description.

As described above, as the body portions 211, 221, 231, and 241 included in the first gripper 210 to the fourth gripper 240 rotate in the first rotational direction about the rotation shafts 213 to 243, as shown in FIG. 6D, contact portions (e.g. contact portion 2111) respectively at ends of the body portions 211 to 241 may move adjacently to grip the lid C of the sample case. In this case, the contact pad 216 may be between the lid C of the sample case B and the contact portion 2111, and thus a holding force may be improved.

Figure 7A:
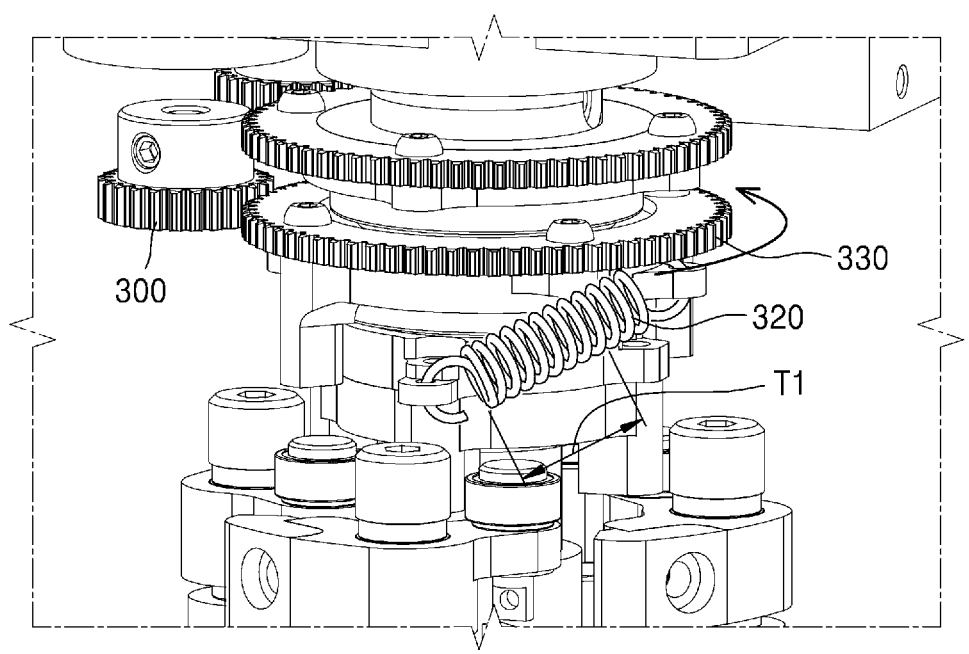
FIG. 7A is a partial perspective view of a gripper device according to an example embodiment.
Figure 7B:
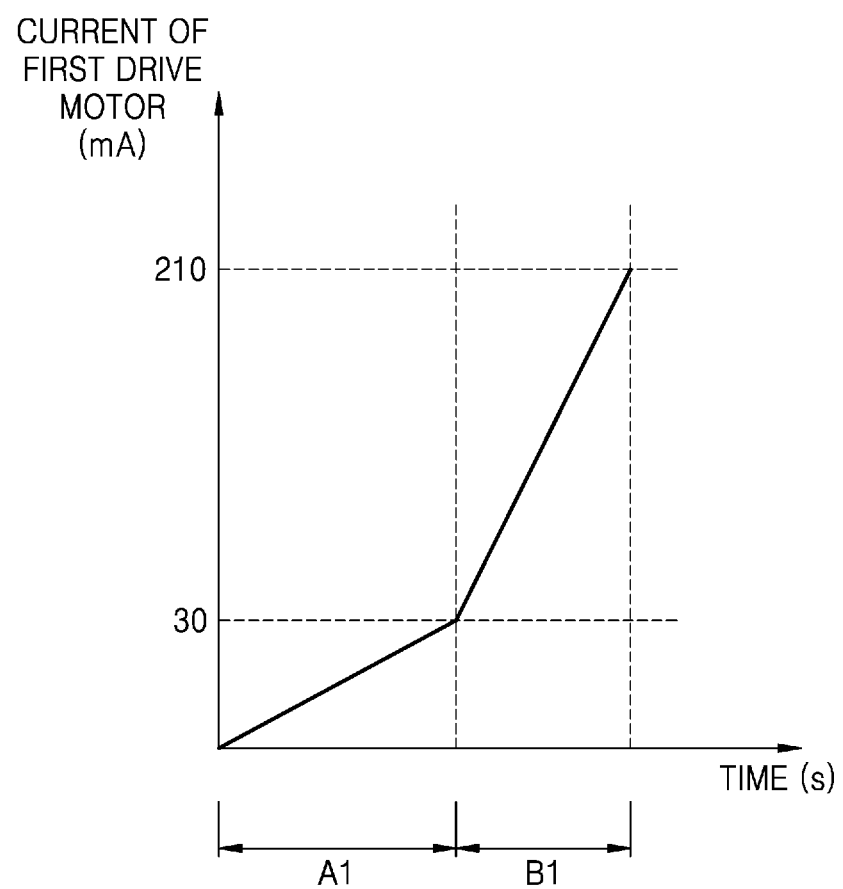
FIG. 7B is a graph showing a relationship between a drive current and a drive time of a first drive motor.
Figure 8:
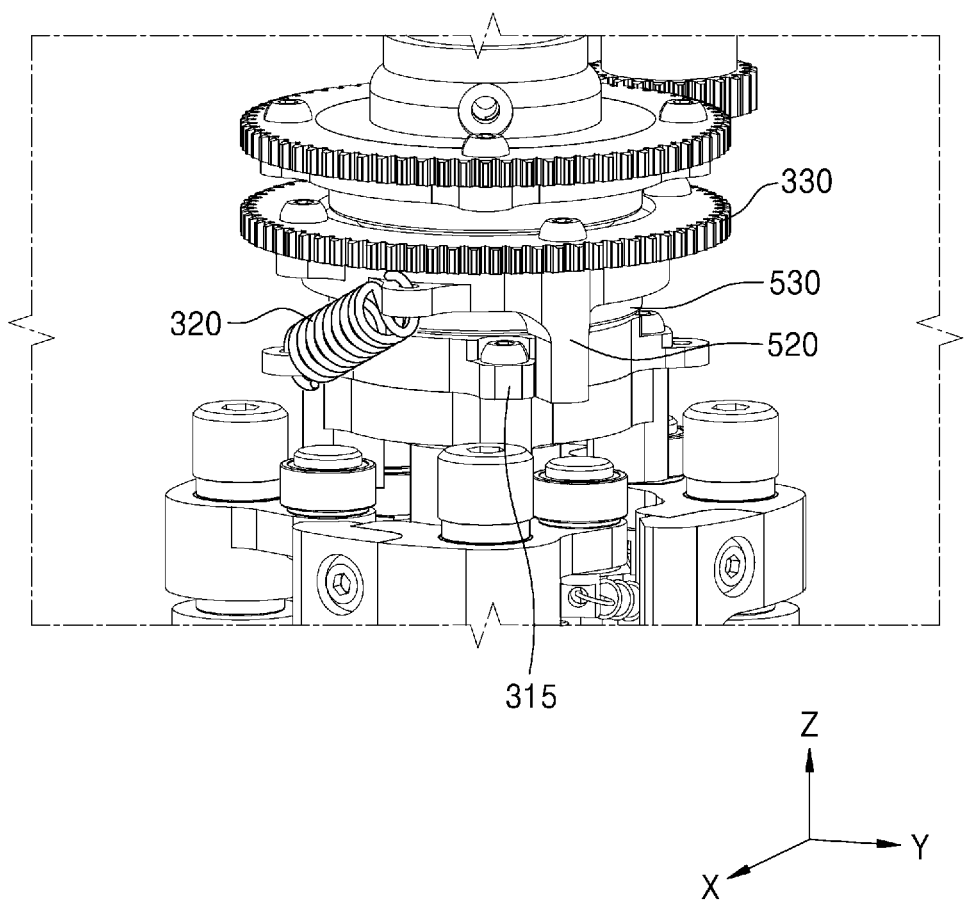
FIG. 8 is a partial perspective view of a gripper device according to an example embodiment.

FIG. 7A is a partial perspective view of a gripper device according to an example embodiment. FIG. 7B is a graph showing a relationship between a drive current and a drive time of a first drive motor. FIG. 8 is a partial perspective view of a gripper device according to an example embodiment.

As shown in FIG. 6D, when the contact portions (e.g. contact portion 2111) at one ends of the body portion 211 to 241 contact the lid C of the sample case B and grips the lid C of the sample case B, the first elastic member 320 may be expanded to the first length T1. For example, when the first elastic member 320 is expanded beyond the first length T1, a holding force for holding the lid C of the sample case B may be increased.

Referring to FIG. 7A, the first drive motor 300 may additionally generate a driving force as compared to the time of holding the lid C of the sample case B shown in FIG. 6D. The driving force generated from the first drive motor 300 may be transmitted to the first power transmission gear 330, and the first power transmission gear 330 may further rotate about the base portion 110 in a second rotational direction, that is, in a counterclockwise direction. As the first power transmission gear 330 rotates in the second rotational direction, the first elastic member 320 having the other end fixed to the first power transmission gear 330 may be expanded beyond the first length T1. In this case, as shown in FIG. 6D, the contact portions (e.g. contact portion 2111) at one ends of the body portions 211 to 241 contact the lid C of the sample case B and hold the lid C of the sample case B, the first power transmitter 310 fixed to one end of the first elastic member 320 does not rotate. As the first elastic member 320 is expanded beyond the first length T1, an increased restoring force of the first elastic member 320 may be applied to the first power transmitter 310 in the second rotational direction. The restoring force applied in the second rotational direction to the first power transmitter 310 may be transmitted to the body portions 211 to 241. Accordingly, the body portions 211 to 241 may grip the lid C of the sample case B more strongly in a first rotational direction.

The holding force of the body portions 211 to 241 holding the lid C of the sample case B may increase as a length of the first elastic member 320 is expanded beyond the first length T1. Accordingly, the controller 700 may transmit to the first drive motor 300 a control signal for controlling the body portions 211 to 241 to hold the lid C of the sample case B and a control signal for controlling the body portions 211 to 241 to adjust the holding force of the lid C of the sample case B.

For example, as shown in FIG. 7B, the current applied to the first drive motor 300 is gradually increased until the first gripper 210 to the fourth gripper 240 rotate in the first rotational direction to hold the lid C of the sample case B, that is, in section A1 where the first elastic member 320 is less than the first length T1. Meanwhile, it can be seen that the current increases rapidly after holding the lid C of the sample case B, that is, in section B1 where the first elastic member 320 exceeds the first length T1 and the holding force increases. Accordingly, the controller 700 may distinguish a control signal for holding the lid C of the sample case B and a control signal for increasing the holding force and may transmit the distinguished control signals to the first drive motor 300. However, when a driving force is continuously generated by the first drive motor 300, the first elastic member 320 may be expanded beyond an elastic limit of the first elastic member 320. Therefore, even when a driving force is generated by the first drive motor 300, a method of preventing expansion of the first elastic member 320 is required.

Referring to FIGS. 2A and 8, a plurality of the stopper 520 according to an example embodiment may be provided to be apart from each other with a certain interval about the base portion 110. In addition, the stopper supporter 315 may be provided in the first power transmitter 310 to be arranged to interfere with the stopper 520 according to a rotation range.

For example, as described above, the first elastic member 320 may be expanded beyond the first length T1 by the driving force by the first drive motor 300. At this time, the stopper 520 arranged to be separated by the first bearing part 530 rotates in one direction together with the first power transmission gear 330. However, the stopper supporter 315 included in the first power transmitter 310 may be restrained and stopped by the holding force between the first gripper 210 and the fourth gripper 240 and the lid C of the sample case B. Accordingly, when the stopper 520 continuously rotates in one direction, the stopper 520 may interfere with the stopper supporter 315 to stop the rotation. Accordingly, the expansion of the first elastic member 320 may also be stopped to prevent the first elastic member 320 from expanding beyond a certain range, for example, an elastic limit.

Figure 9A:
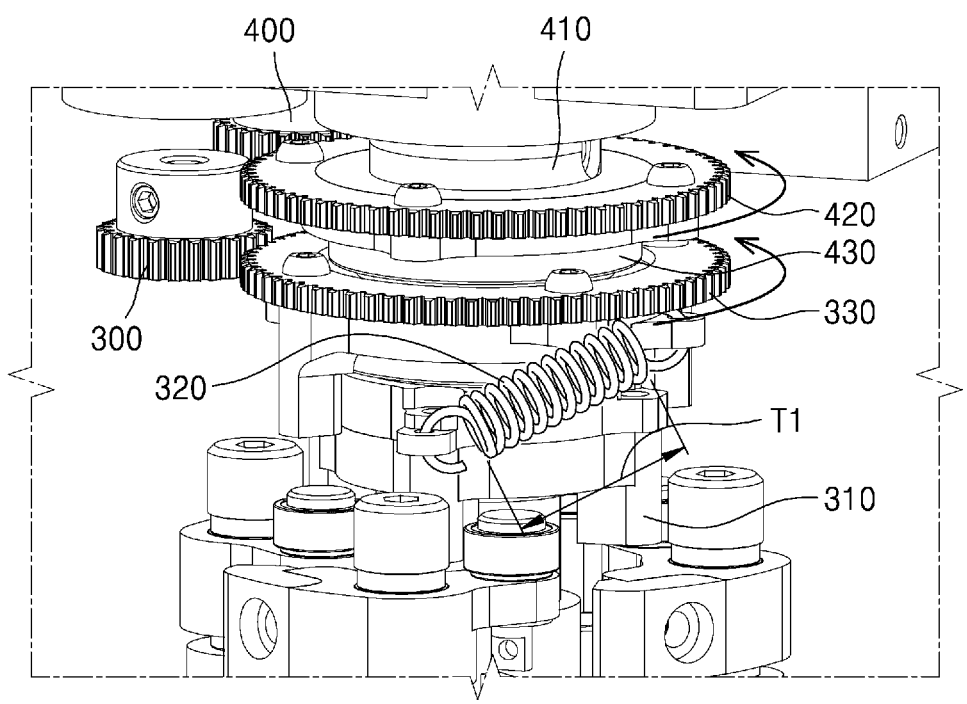
FIG. 9A is a partial perspective view of a sample transfer device according to an example embodiment.
Figure 9B:
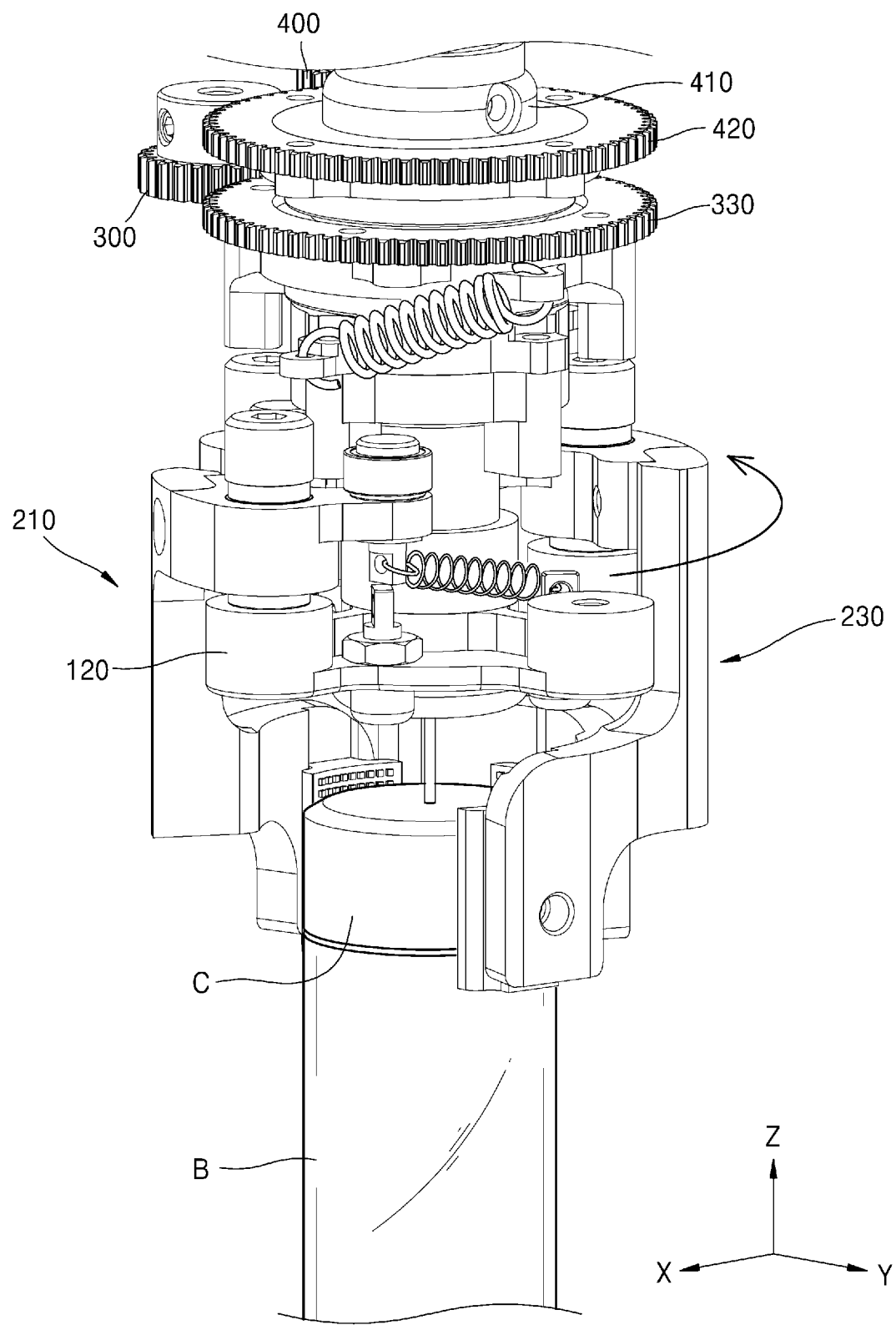
FIG. 9B is a perspective view of a sample transfer device according to an example embodiment.

FIG. 9A is a partial perspective view of a sample transfer device according to an example embodiment. FIG. 9B is a perspective view of a sample transfer device according to an example embodiment.

As shown in FIG. 6D, when the lid C of the sample case B is held by the first gripper 210 to the fourth gripper 240, the lid C of the sample case B may be separated from the sample case B if the lid C of the sample case B may be rotated about the sample case B. At this time, a holding force for holding the lid C of the sample case B by using the first gripper 210 to the fourth gripper 240 needs to be kept constant.

Referring to FIGS. 9A to 9B, the second drive motor 400 according to an example embodiment may have a driving force for rotating the lid C of the sample case B held by the first gripper 210 to the fourth gripper 240. The second power transmission gear 420 may rotate in a second direction of rotation by the driving force generated by the second drive motor 400. The second power transmitter 410 fixed to the second power transmission gear 420 and the base portion 110 arranged to be fixed to the second power transmitter 410 may also rotate in the second direction of rotation about the first direction Z. In this case, the second bearing part 430 (e.g. second bearing) may be between the second power transmitter 410 and the first power transmission gear 330, and accordingly, the second power transmitter 410 and the first power transmission gear 330 may rotate independently of each other.

The base portion 110 that receives the driving force from the second power transmitter 410 may rotate in the second rotational direction about the first direction Z, and the gripper supporter 120 and the first gripper 210 to the fourth gripper 240 connected to be fixed to the base portion 110 may rotate in the second rotational direction about the base portion 110. Accordingly, the lid C of the sample case B held by the first gripper 210 to the fourth gripper 240 may also rotate in the second rotational direction. In this case, since the sample case B may be supported by the case supporter 30 (see FIG. 1), the lid C of the sample case B may be separated from the sample case B by rotating about the sample case B.

As described above, the first gripper 210 to the fourth gripper 240 rotates in the second rotational direction about the base portion 110, and when the first power transmitter 310 connected to the first gripper 210 to the fourth gripper 240 does not rotate using the first elastic member 320, the expanded length of the first elastic member 320 may vary. Accordingly, the holding force of the first gripper 210 to the fourth gripper 240 with respect to the lid C of the sample case B may be weakened.

The first drive motor 300 according to an example embodiment may generate a driving force such that the first power transmitter 310 rotates in the second rotational direction at the same speed as the base portion 110, as shown in FIG. 9A. Accordingly, even while the lid C of the sample case is rotated to be opened, the expansion length of the first elastic member 320 may be kept constant. Also, the holding force of the first gripper 210 to the fourth gripper 240 with respect to the lid C of the sample case B may be maintained.

Figure 10A:
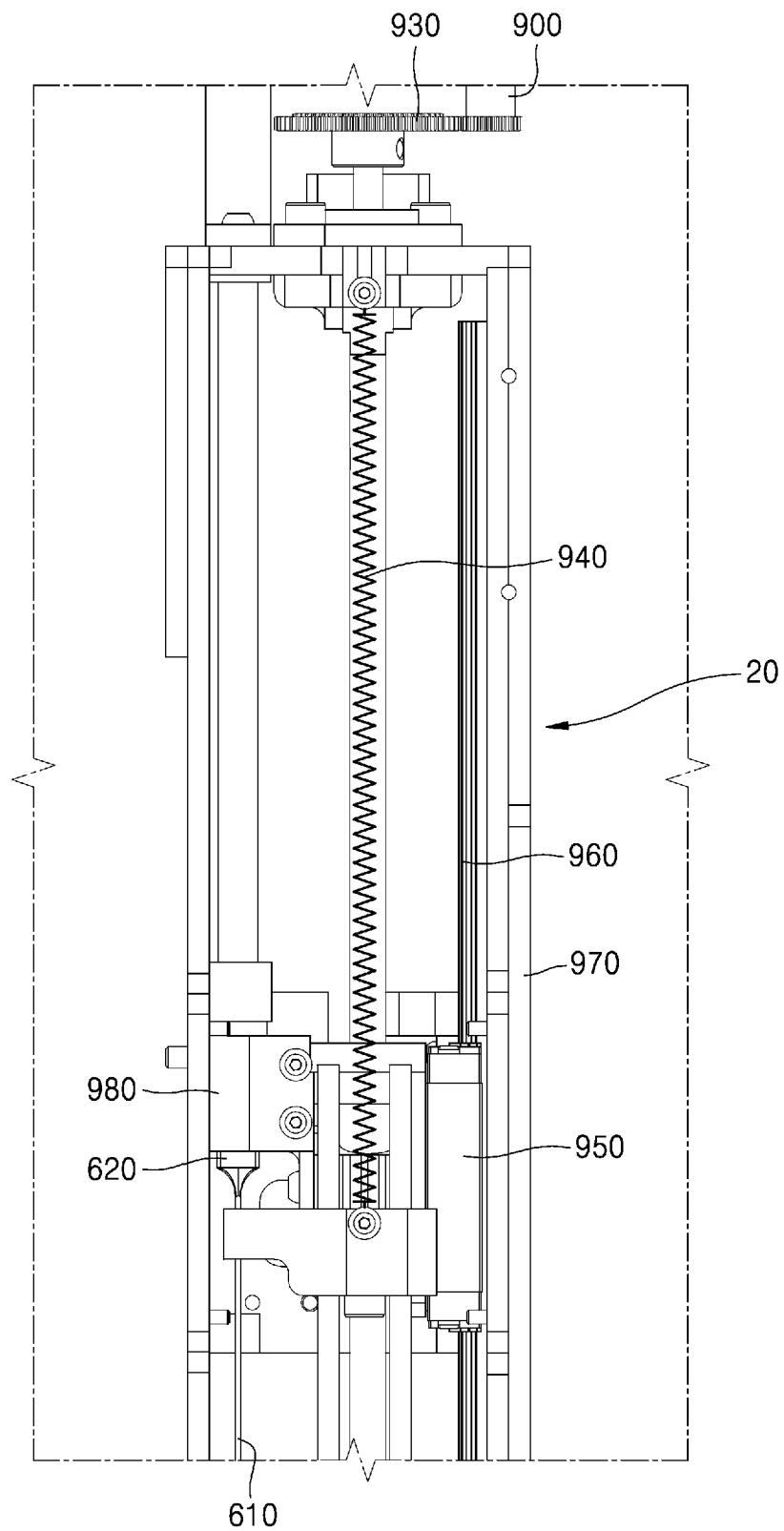
FIG. 10A is a side cross-sectional view of a sample transfer device according to an example embodiment.
Figure 10B:
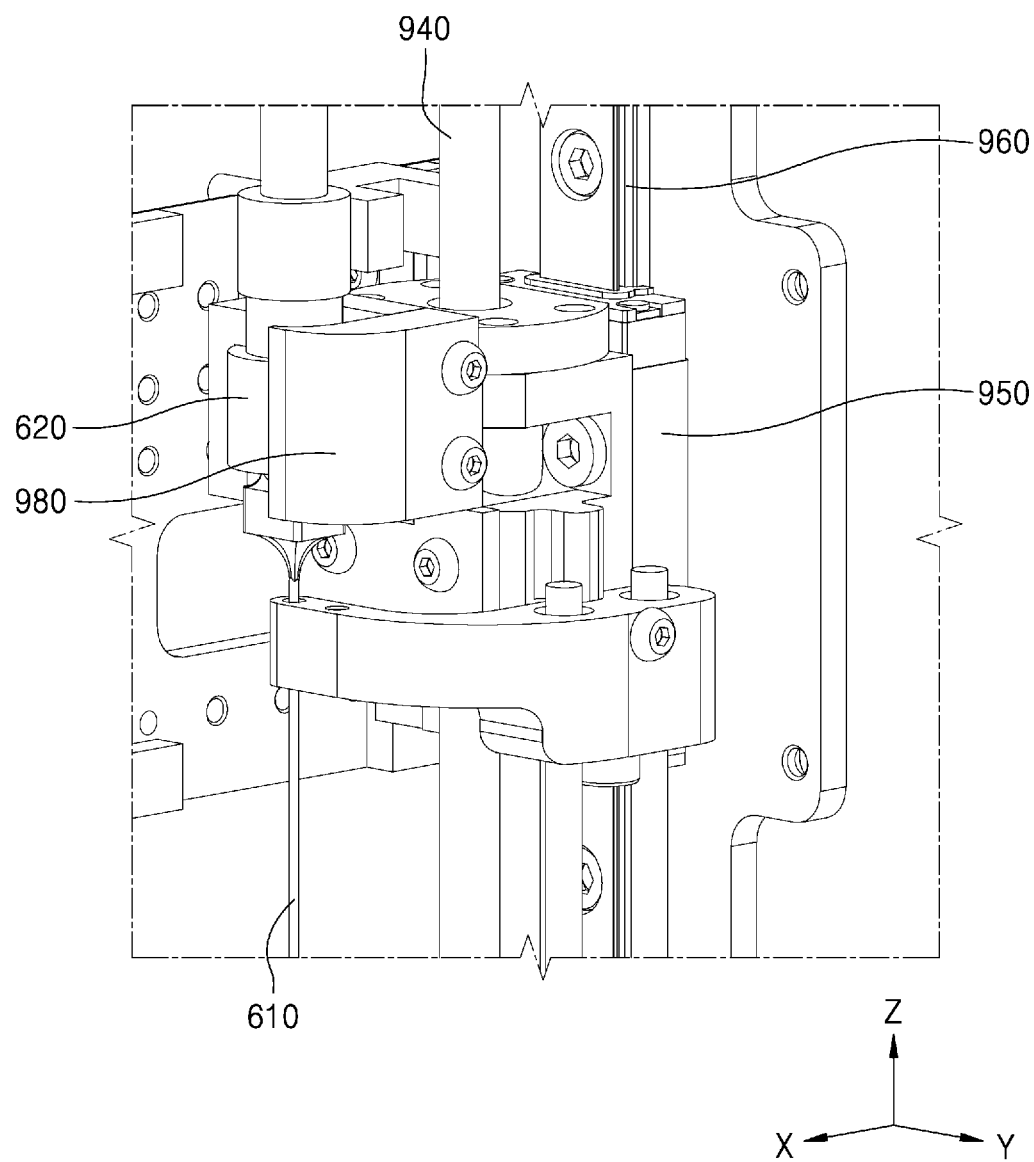
FIG. 10B is a perspective view of a sample transfer device according to an example embodiment.
Figure 10C:
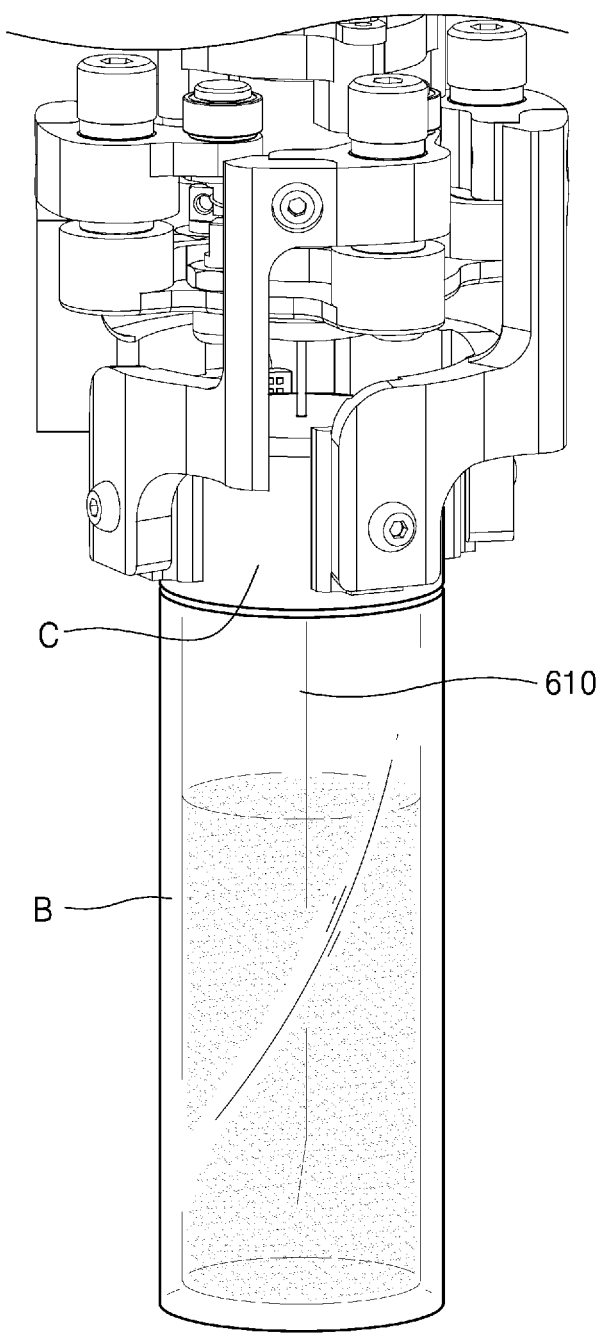
FIG. 10C is a perspective view of a state in which a sample carrier is lowered according to an example embodiment.

FIG. 10A is a side cross-sectional view of a sample transfer device according to an example embodiment. FIG. 10B is a perspective view of a sample transfer device according to an example embodiment. FIG. 10C is a perspective view of a state in which a sample carrier is lowered according to an example embodiment.

Referring to FIGS. 10A to 10C, the sample transfer device 20 according to an example embodiment may include the third drive motor 900, a third power transmission gear 930, a third power transmitter 940, a slide portion 950, a slide guide 960, a housing portion 970, and a fastening supporter 980. The sample carrier 600 (refer to FIG. 2) may move up or down in the first direction Z to inject or inhale a sample. The third drive motor 900 may generate a driving force for raising or lowering the sample carrier 600. The driving force generated by the third drive motor 900 may be transmitted to the third power transmission gear 930. The driving force transmitted to the third power transmission gear 930 may be changed into a driving force for raising or lowering through the third power transmitter 940. For example, the third power transmitter 940 may be a ball-screw that may convert a rotational force into a driving force for linear motion. However, the disclosure is not limited thereto, and another type of momentum converter capable of converting the rotational force into the driving force for linear motion may be used.

For example, the third power transmitter 940 may raise or lower the slide portion 950 by using the driving force received from the third power transmission gear 930. In this case, the slide portion 950 may ascend or descend along the slide guide 960 extending in the first direction Z. The fastening supporter 980 may fix the supporter 620 provided in the sample carrier 600 to the slide portion 950, and thus the sample carrier 600 may move up or down with the slide portion 950. As the sample carrier 600 moves up or down, the pipette 610 provided in the sample carrier 600 may be introduced into the sample case B or discharged from the sample case B. In the above-described example embodiment, the pipette 610 is introduced into or discharged from the sample case B while the lid C of the sample case B on the top of the sample case B is opened. However, the disclosure is not limited thereto.

According to an example embodiment, one end of the pipette 610 may be provided in the shape of a needle as shown in FIG. 10O. At this time, even when the lid C of the sample case B is coupled to the sample case B and closed, the pipette 610 may descend. Accordingly, the pipette 610 may be inserted into the sample case B by piercing the lid C of the sample case B or may be discharged from the sample case B to transfer a sample.

Figure 11:
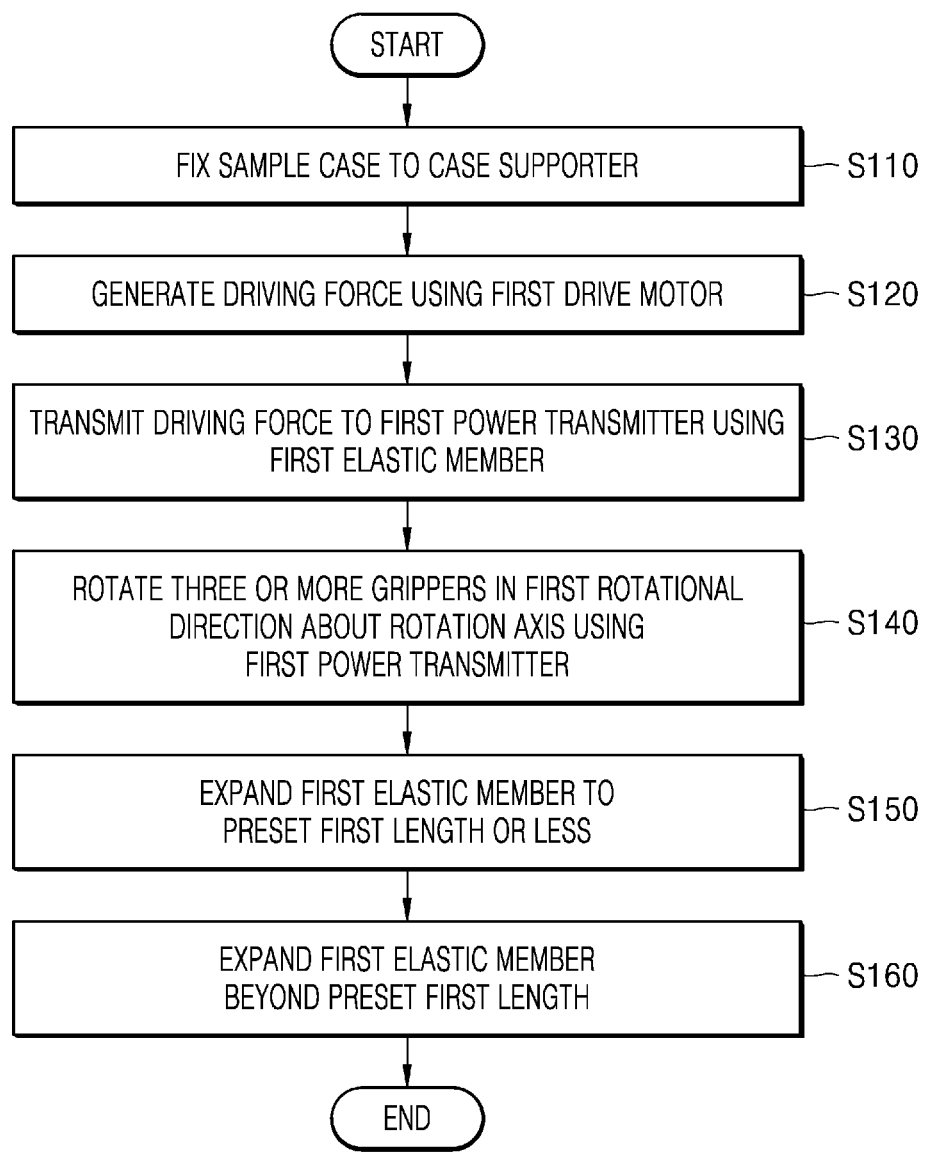
FIG. 11 is a flowchart illustrating gripping of a sample case or a lid of the sample case in a method of operating a gripper assembly according to an example embodiment.

FIG. 11 is a flowchart illustrating holding of a sample case or a lid of the sample case in a method of operating a gripper assembly according to an example embodiment.

Referring to FIG. 11, the sample case according to an example embodiment may be fixed to a case supporter. In operation S110, according to an example embodiment, the sample case B including a sample may be fixed to the case supporter 30. Operation S110 may be to open the lid C of the sample case B on the top of the sample case B, and may be omitted in an operation method for holding the sample itself or the sample case B.

Next, a driving force may be generated using a first drive motor. In operation S120, according to an example embodiment, the controller 700 may transmit a control signal capable of generating a driving force, for the three or more grippers 200 to hold the sample case B or the lid C of the sample case B, to the first drive motor 300, and the first drive motor 300 may generate a driving force according to the received control signal.

Next, the driving force may be transmitted to the first power transmitter 310 by using the first elastic member 320. In operation S130, according to an example embodiment, the driving force generated by the first drive motor 300 may be transmitted to the first power transmitter 310 through the first elastic member 320, and thus the first power transmitter 310 may rotate in a second rotational direction.

Next, the three or more grippers 200 may be rotated in a first rotational direction about a rotation axis by using the first power transmitter 310. In operation S140, according to an example embodiment, the three or more grippers 200 may be simultaneously applied with a pressing force by the first power transmitter 310, and may rotate in the first rotational direction about the rotation axis. Accordingly, the three or more grippers 200 may approach the sample case B or the lid C of the sample case B.

Next, the first elastic member 320 may be expanded to the preset first length T1 or less. In operation S150, according to an example embodiment, the first elastic member 320 that transmits the driving force generated by the first drive motor 300 may be expanded to the preset first length T1 or less. When the first elastic member 320 is expanded to the first length T1, the three or more grippers 200 may grip the sample case B or the lid C of the sample case B by contacting the sample case B below the base portion 110 or the lid C of the sample case B.

Next, the first elastic member 320 may be expanded beyond the first certain length T1. In operation S160, according to an example embodiment, the first elastic member 320 that transmits the driving force generated by the first drive motor 300 may be expanded beyond the preset first length T1. When the first elastic member 320 is expanded beyond the first length T1, the three or more grippers 200 may increase a contact force between the base portion 110 and the sample case B or the lid C of the sample case B, thereby increasing the holding force on the sample case B or the lid C of the sample case B. However, at this time, the expansion of the first elastic member 320 may be limited by the stopper 520 such that the first elastic member 320 does not expand beyond a certain range, for example, an elastic limit.

Figure 12:
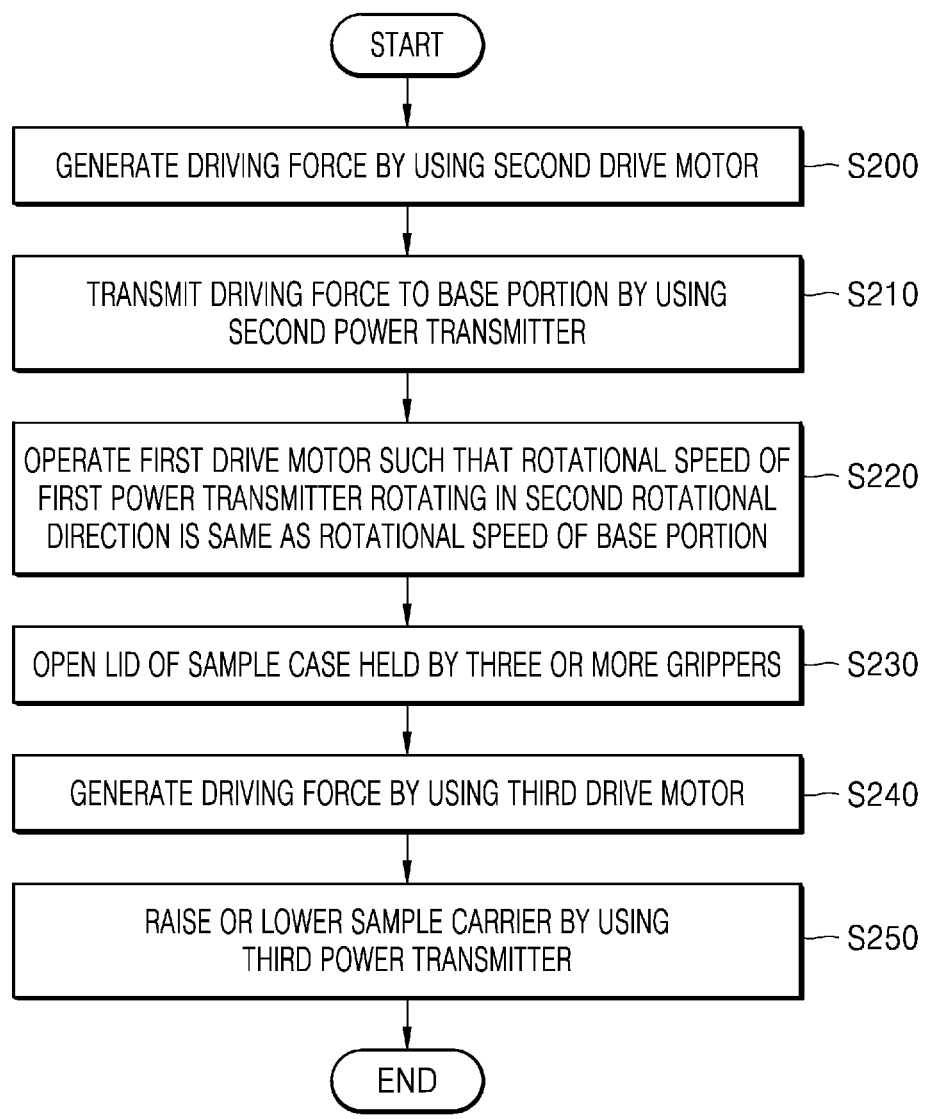
FIG. 12 is a flowchart illustrating a method of opening a lid of a sample case and lowering a sample carrier in a method of operating a gripper assembly according to an example embodiment.

FIG. 12 is a flowchart illustrating a method of opening a lid of a sample case and lowering a sample carrier in a method of operating a gripper assembly according to an example embodiment.

Referring to FIG. 12, a driving force may be generated using a second drive motor. In operation S200, according to an example embodiment, the controller 700 may transmit a control signal capable of generating a driving force for rotating the base portion 110 and the three or more grippers 200 connected to be fixed to the base portion 110 about the first direction Z to the second drive motor 400. The second drive motor 400 may generate a driving force according to the received control signal.

Next, the driving force may be transmitted to the base portion by using the second power transmitter. In operation S210, according to an example embodiment, the driving force generated by the second drive motor 400 may be transmitted to the base portion 110 through the second power transmitter 410. Accordingly, the base portion 110 may rotate in a second rotational direction about the first direction Z, and the gripper supporter 120 and the three or more grippers 200 connected to be fixed to the base portion 110 may rotate in the second rotational direction about the base portion 110.

Next, the first drive motor 300 may be operated such that a rotational speed of the first power transmitter 310 rotating in the second rotational direction is the same as a rotational speed of the base portion. In operation S220, according to an example embodiment, when the base portion 110, the gripper supporter 120 connected to be fixed the base portion 110, and the three or more grippers 200 rotate in the second rotational direction by the second drive motor 400, if the first power transmitter 310 connected to the three or more grippers 200 by using the first elastic member 320 does not rotate, a holding force for holding the lid C of the sample case B using the three or more grippers 200 may be weakened. In order to prevent such a phenomenon, the first drive motor 300 may generate a driving force such that the first power transmitter 310 rotates in the second rotational direction at the same speed as the second drive motor 400. Accordingly, the holding force for holding the lid C of the sample case B using the three or more grippers 200 may be maintained.

Next, the lid of the sample case held by the three or more grippers may be opened. In operation S230, according to an example embodiment, the sample case B may be fixed by the case supporter 30, and the lid C of the sample case B may be held and rotated by the three or more grippers 200. At this time, the holding force by the three or more grippers 200 may be maintained the same. Accordingly, the lid C of the sample case B may rotate in the second rotational direction about the sample case B, and the lid C of the sample case B may be opened (e.g. removed) from the sample case B.

Next, a driving force may be generated using the third drive motor 900. In operation S240, according to an example embodiment, the controller 700 may transmit a control signal capable of generating a driving force for raising or lowering the sample carrier 600 in the first direction Z to the third drive motor 900. The third drive motor 900 may generate a driving force according to the received control signal.

Next, the sample carrier 600 may be raised or lowered by using the third power transmitter 940. In operation S250, according to an example embodiment, the driving force generated by the third drive motor 900 may be transmitted to the sample carrier 600 through the third power transmitter 940. Accordingly, the sample carrier 600 may move up or down in the first direction Z. As the sample carrier 600 is raised or lowered, the pipette 610 included in the sample carrier 600 may be introduced into or discharged from the sample case B to collect or transfer a sample.

A gripper assembly according to an example embodiment may hold a sample case and open a lid of the sample case using a single gripper assembly.

In addition, the gripper assembly according to an example embodiment may control a holding force for holding the sample case.

In addition, the gripper assembly according to an example embodiment may include a sample carrier to transfer a sample from the sample case with the lid open.

In addition, a pipette provided in the sample carrier of the gripper assembly according to an example embodiment may be provided in the shape of a needle to transfer the sample from the sample case with the lid closed.

It should be understood that a gripper assembly and a method of operating the gripper assembly of the disclosure have been described with reference to the example embodiments shown in the drawings for clarity and not for purposes of limitation. Descriptions of features or aspects within each example embodiment should typically be considered as available for other similar features or aspects in other embodiments.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope of the disclosure.

What is claimed is:

1. A gripper assembly comprising:
a base having a hollow area extending in a first direction;
at least three grippers arranged along a circumference of the base, the at least three grippers being configured to be rotatable about respective rotational axes extending in the first direction;
a first power transmitter configured to rotate the at least three grippers at the same time in a first rotational direction about the respective rotational axes;
a first drive motor configured to generate a first driving force transmitted to the at least three grippers; and
a first elastic body having one end connected to the first power transmitter and another end connected to the first drive motor, the first elastic body configured to transmit the first driving force to the first power transmitter.

2. The gripper assembly of claim 1, further comprising:
a second drive motor configured to generate a second driving force for rotating the base about the first direction; and
a second power transmitter configured to transmit the second driving force to the base such that the base rotates about the first direction.

3. The gripper assembly of claim 2, further comprising a controller comprising at least one processor, the controller being configured to control the first drive motor and the second drive motor,
wherein the controller is further configured to, in a case where the second drive motor is operated, control the first drive motor such that a rotational speed of the base and a rotational speed of the first power transmitter are the same.

4. The gripper assembly of claim 1, wherein the first power transmitter comprises at least three power transmission cams corresponding to the at least three grippers, respectively.

5. The gripper assembly of claim 1, further comprising a stopper configured to limit the first elastic body from expanding above a certain length.

6. The gripper assembly of claim 1, further comprising a second elastic body having one end connected to the base and another end connected to a gripper from among the at least three grippers, the second elastic body being configured to apply a restoring force to the gripper in a second rotational direction opposite to the first rotational direction.

7. The gripper assembly of claim 1, further comprising a controller comprising at least one processor, the controller being configured to control the first drive motor,
wherein the controller is further configured to control the first drive motor to expand the first elastic body to a first length, the first length being a length of the first elastic body in which the at least three grippers start gripping a lid of a sample case, or the sample case, below the base.

8. The gripper assembly of claim 7, wherein the controller is further configured to control the first drive motor to expand the first elastic body beyond the first length.

9. The gripper assembly of claim 1, further comprising a contact pad at one end of a gripper from among the at least three grippers.

10. A gripper assembly comprising:
a base having a hollow area extending in a first direction;
at least three grippers arranged along a circumference of the base, the at least three grippers being configured to be rotatable about respective rotational axes extending in the first direction;
a first power transmitter configured to rotate the at least three grippers at the same time in a first rotational direction about the respective rotational axes; and
a sample carrier in the hollow area of the base.

11. The gripper assembly of claim 10, further comprising:
a drive motor configured to generate a driving force for moving the sample carrier in the first direction; and
a second power transmitter configured to transmit the driving force to the sample carrier such that the sample carrier moves in the first direction.

12. The gripper assembly of claim 10, further comprising a support guide on an inner wall of the hollow area, the support guide being configured to support the sample carrier.

13. A method of operating a gripper assembly that includes a base having a hollow area extending in a first direction, at least three grippers arranged along a circumference of the base and configured to be rotatable about respective rotational axes extending in the first direction, and a first power transmitter configured to rotate the at least three grippers at the same time in a first rotational direction about the respective rotational axes, the method comprising:
fixing a sample case to a case supporter;
generating a first driving force via a first drive motor of the gripper assembly;
transmitting the first driving force to the first power transmitter via a first elastic body of the gripper assembly, one end of the first elastic body being connected to the first power transmitter and another end of the first elastic body being connected to the first drive motor;
rotating the at least three grippers in the first rotational direction about the respective rotational axes by the first power transmitter receiving the first driving force; and
expanding the first elastic body to a preset first length or less based on the transmitting the first driving force to the first power transmitter via the first elastic body.

14. The method of claim 13, wherein the expanding comprises expanding the first elastic body to the preset first length, the preset first length being a length of the first elastic body in which the at least three grippers start gripping a lid of the sample case below the base.

15. The method of claim 14, further comprising expanding the first elastic body beyond the preset first length such that a contact force between the at least three grippers and the lid of the sample case is increased.

16. The method of claim 15, wherein the gripper assembly includes a stopper configured to limit the first elastic body from expanding above a certain length.

17. The method of claim 15, further comprising:
generating a second driving force via a second drive motor of the gripper assembly;
transmitting the second driving force to the base via a second power transmitter of the gripper assembly such that the base rotates and the base causes the at least three grippers to rotate about the base;
operating, while transmitting the second driving force to the base, the first drive motor such that a rotational speed of the first power transmitter is the same as a rotational speed of the base; and opening the lid of the sample case, held by the at least three grippers, by the at least three grippers rotating about the base while the first drive motor is operated.

18. The method of claim 13, further comprising:

generating a second driving force via a second drive motor of the gripper assembly; and raising or lowering a sample carrier of the gripper assembly by a second power transmitter of the gripper assembly transmitting the second driving force to the sample carrier.

* * * * *